(12) United States Patent
Moreno

(10) Patent No.: US 6,325,293 B1
(45) Date of Patent: Dec. 4, 2001

(54) METHOD AND SYSTEM FOR USING A MICROCIRCUIT CARD IN A PLURALITY OF APPLICATIONS

(75) Inventor: Roland Moreno, Paris (FR)

(73) Assignee: Innovatron, Paris (FR)

( * ) Notice: Subject to any disclaimer, the term of this patent is extended or adjusted under 35 U.S.C. 154(b) by 0 days.

(21) Appl. No.: 09/719,797

(22) PCT Filed: Jun. 15, 1999

(86) PCT No.: PCT/FR99/01427

§ 371 Date: Dec. 28, 2000

§ 102(e) Date: Dec. 28, 2000

(87) PCT Pub. No.: WO99/66461

PCT Pub. Date: Dec. 23, 1999

(30) Foreign Application Priority Data

Jun. 16, 1998 (FR) .................................................. 98 07578

(51) Int. Cl.$^7$ ........................................................ G06K 19/06
(52) U.S. Cl. ............................................. 235/492; 235/380
(58) Field of Search ........................................... 235/492, 380

(56) References Cited

U.S. PATENT DOCUMENTS 4,697,073 * 9/1987 Hara ...................................... 235/492
4,736,094   4/1988 Yoshida .
4,797,542   1/1989 Hara .

FOREIGN PATENT DOCUMENTS 0 361 491   4/1990 (EP) .
0 785 534   7/1997 (EP) .
61-22538 *  4/1986 (JP) .
WO 96 25828 8/1996 (WO) .

* cited by examiner

*Primary Examiner*—Harold I. Pitts
(74) *Attorney, Agent, or Firm*—Nixon & Vanderhye P.C.

(57) ABSTRACT

The method comprises the steps of: coupling the card (24) as initially configured for the default application, with a terminal (14) of the default application, executing a special transaction for reconfiguring the software of the card for the target application so that the card as reconfigured in this way emulates a card specific to the target application; coupling the card as reconfigured in this way with a terminal (18) of the target application; and executing a transaction of the target application. Subsequently, the card as reconfigured for the target application can be coupled with a terminal of the default application, and another special transaction can be executed to return the card to its software configuration for the default application. In particular, the default application can be a SIM card application for GSM radiotelephony, and the target application can be a token-carrier type application.

22 Claims, 16 Drawing Sheets

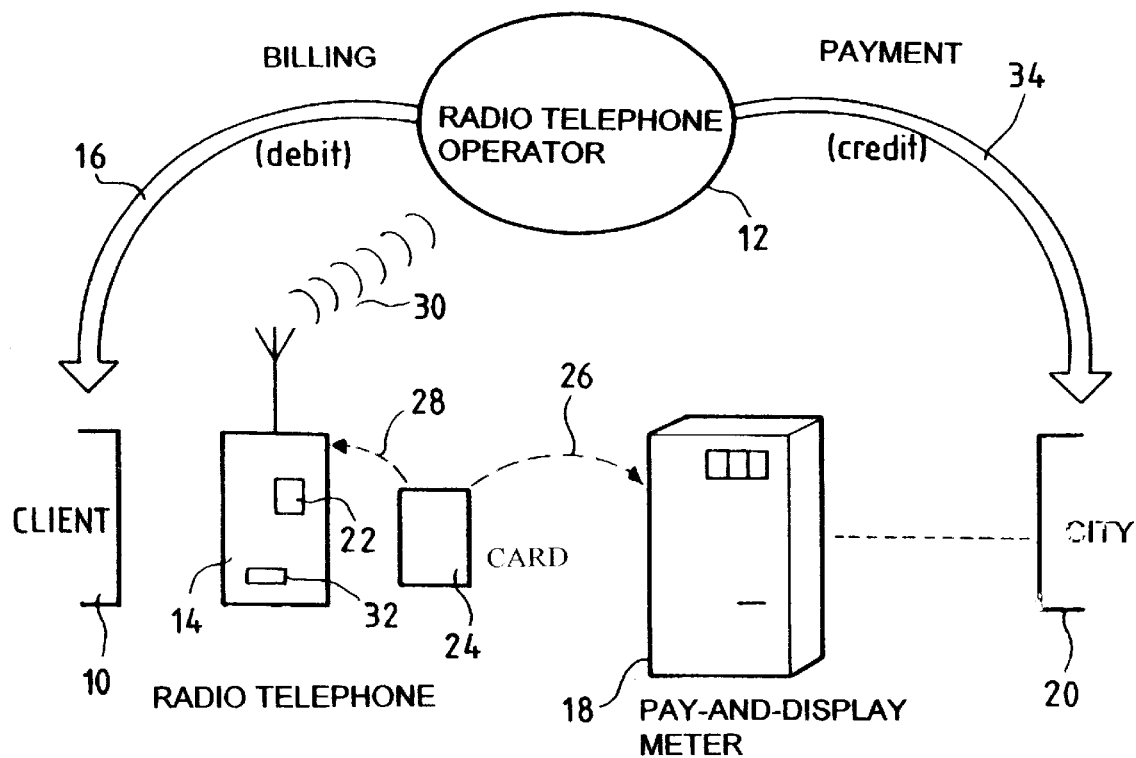
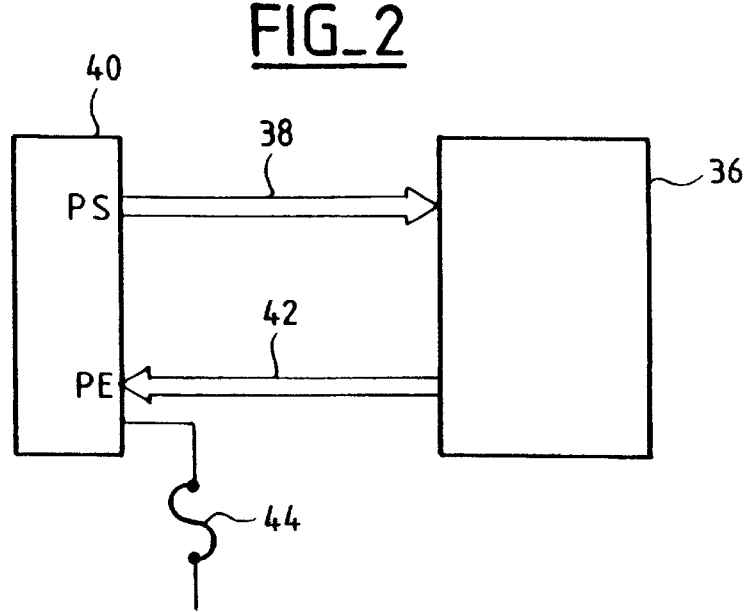

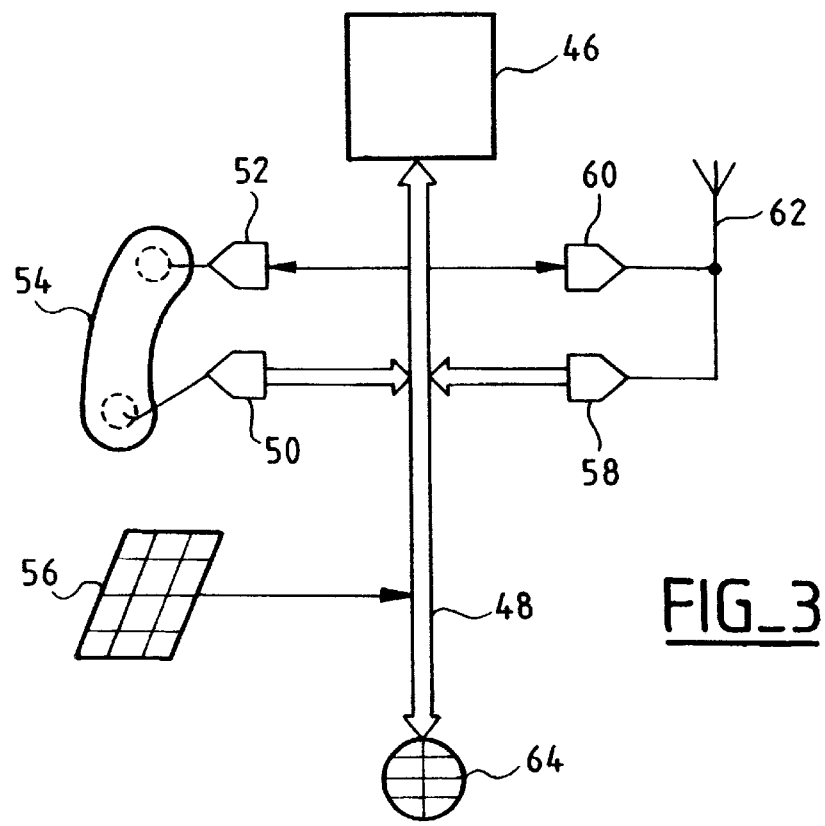
FIG_3
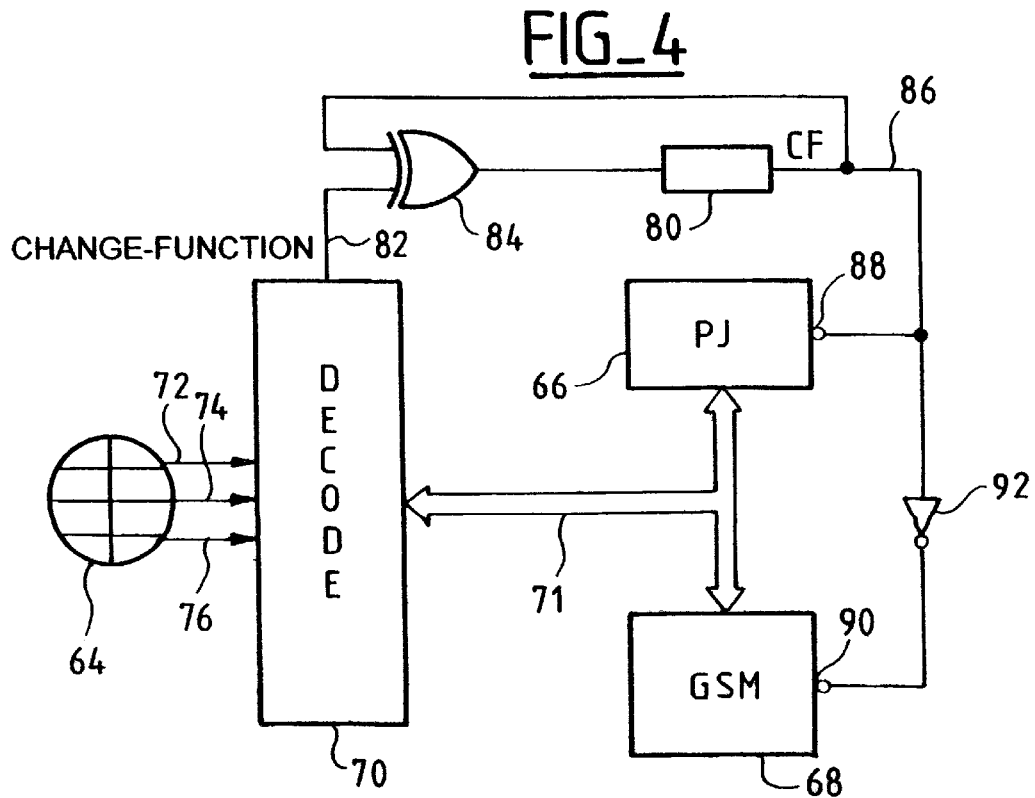
FIG_4

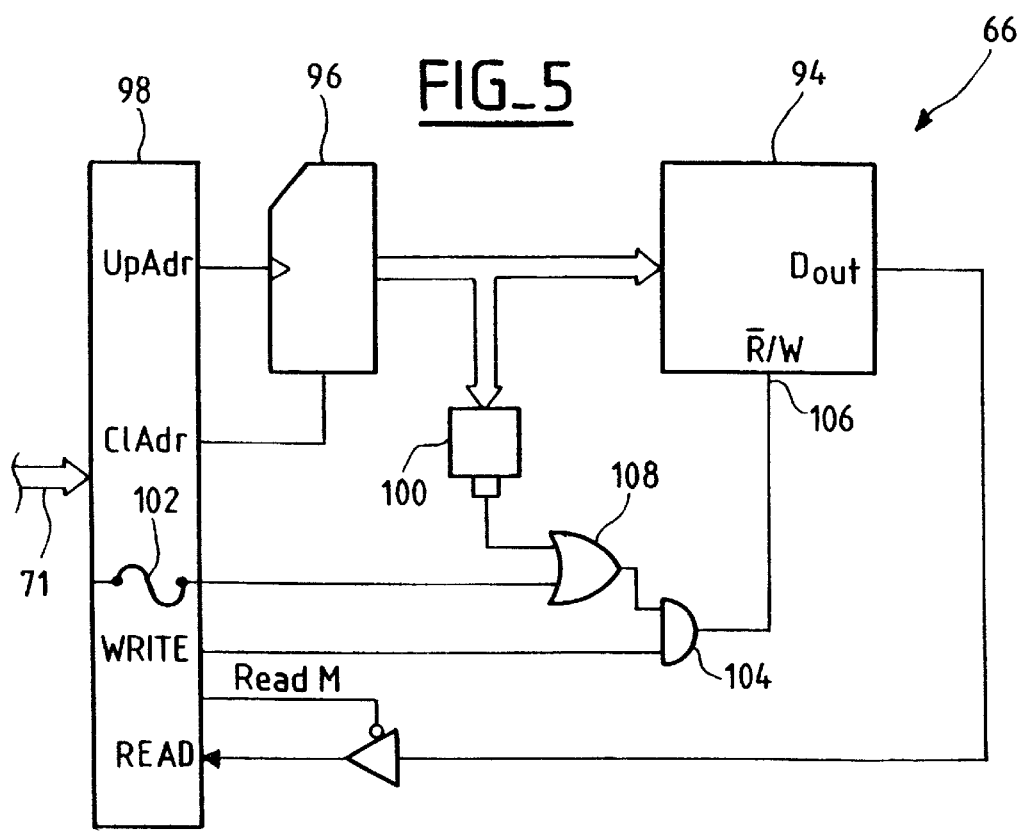
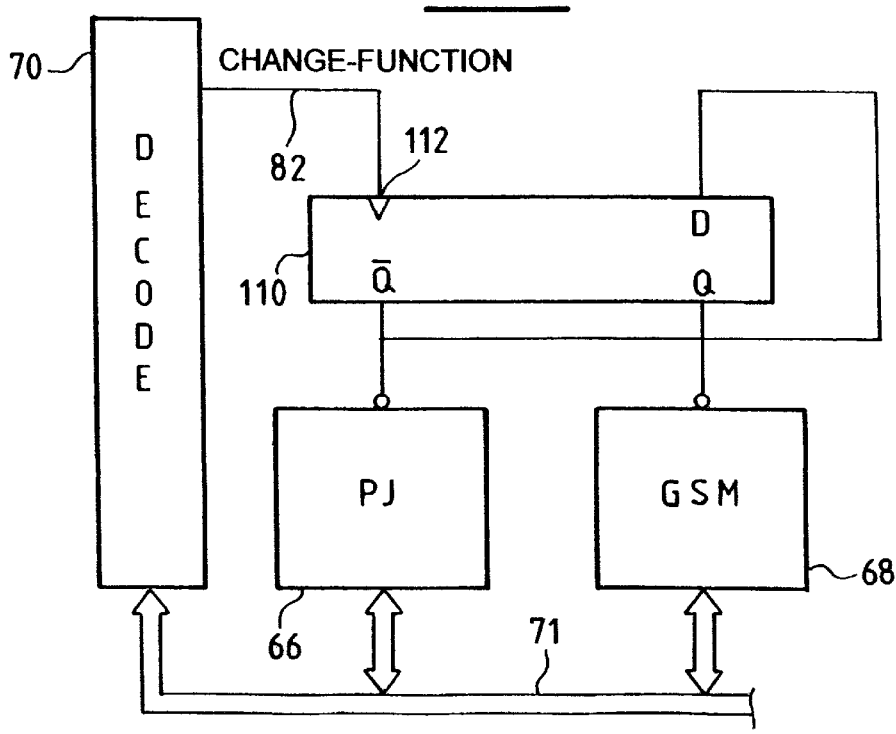

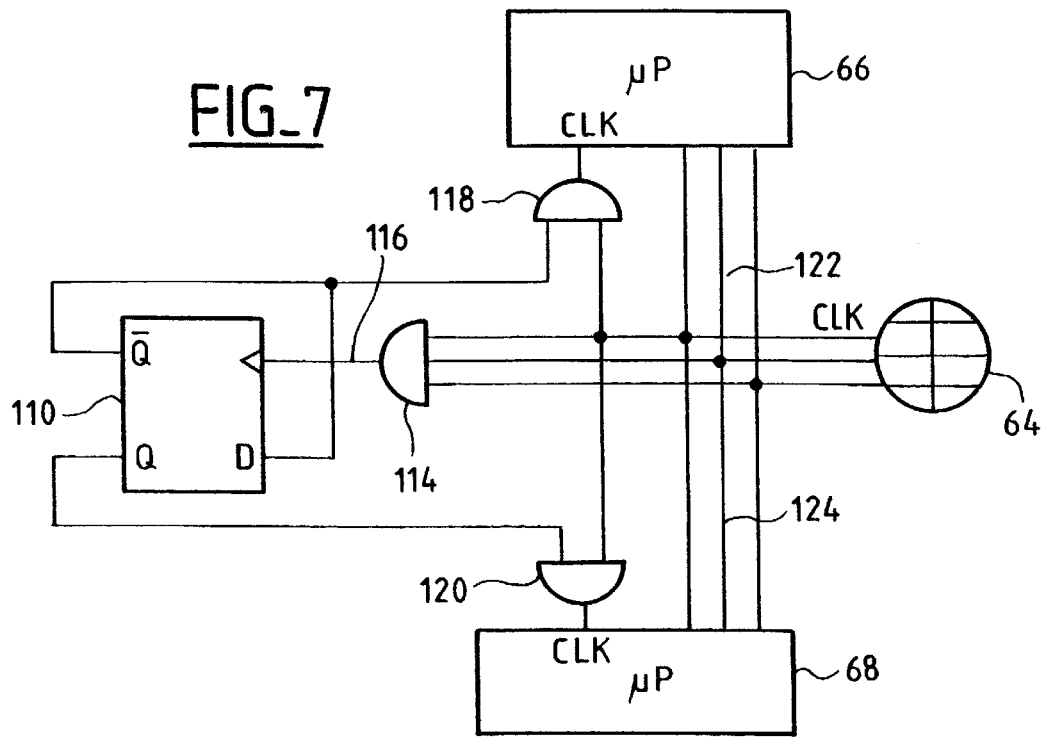
FIG_7
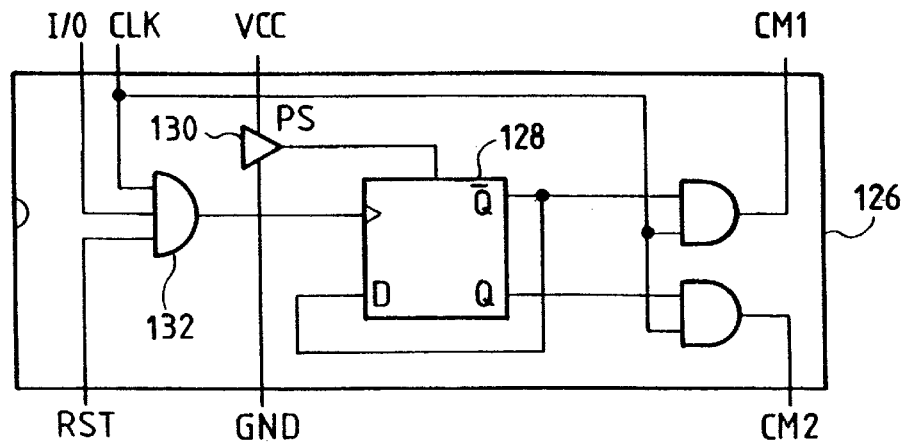
FIG_8
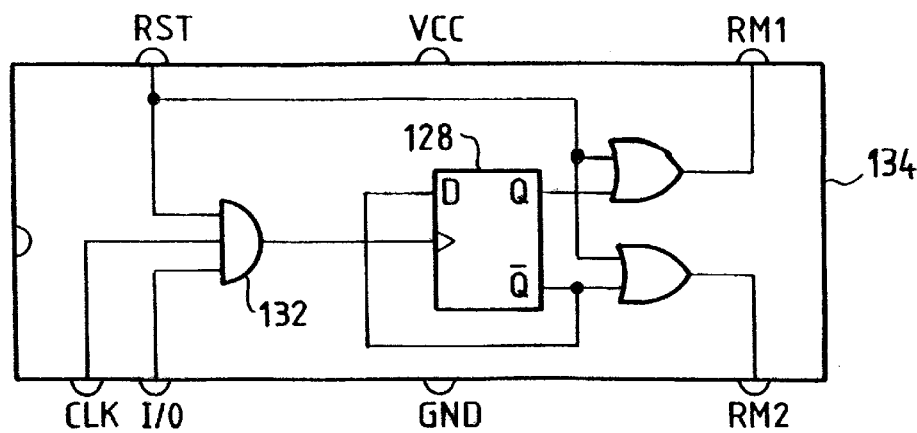
FIG_9

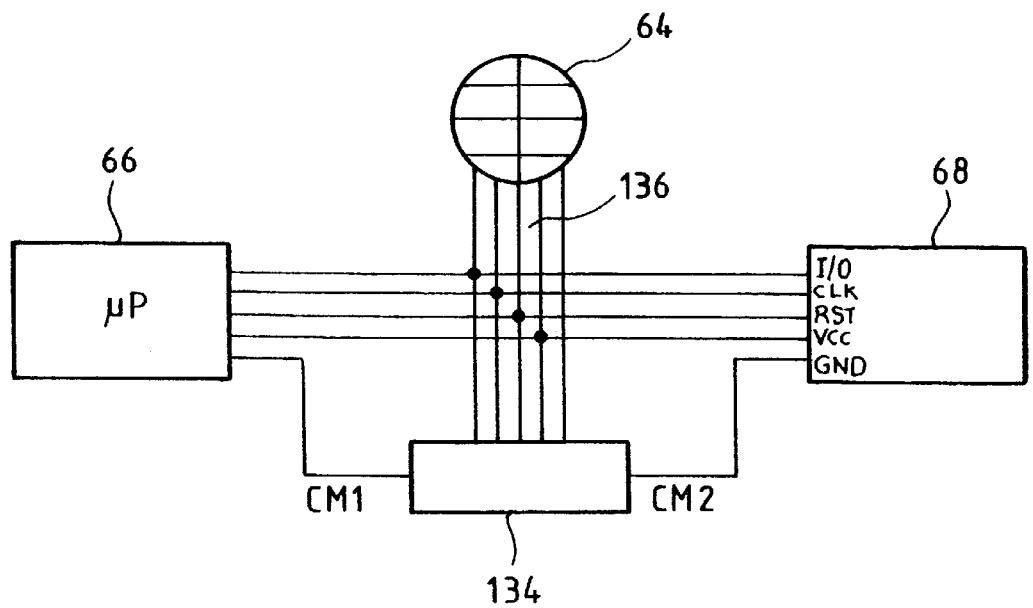
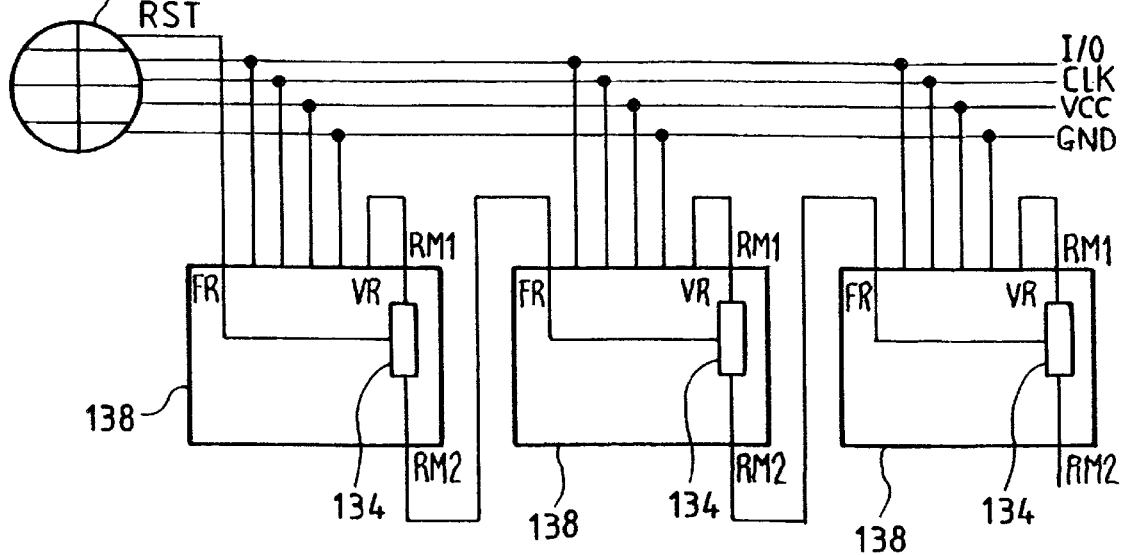

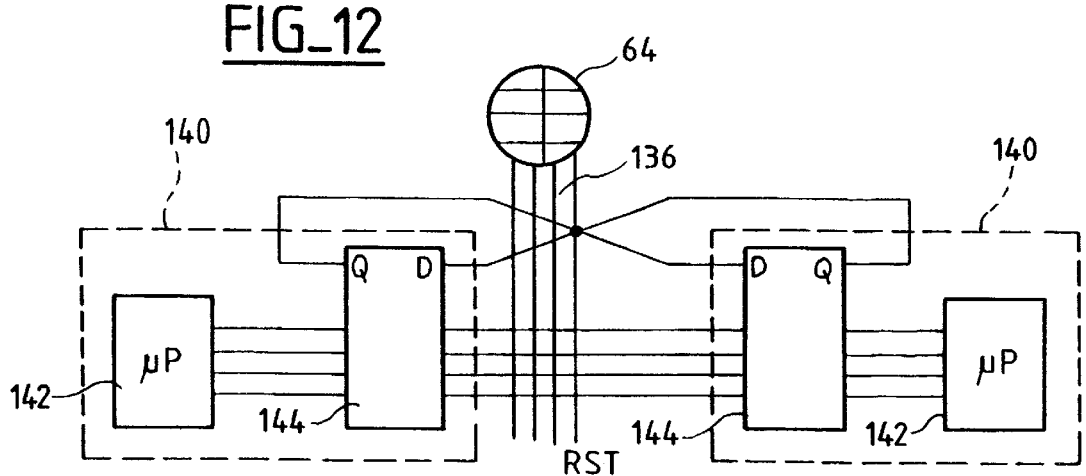
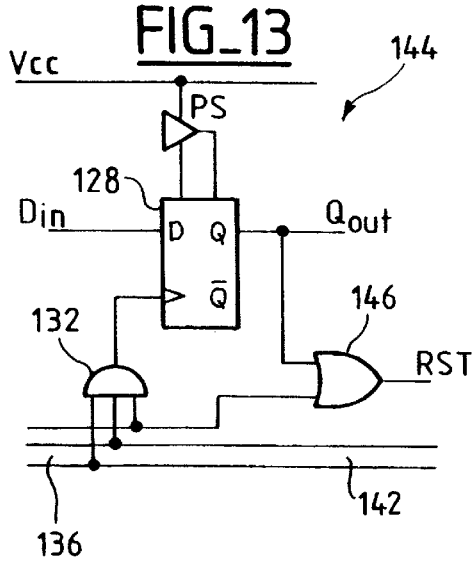
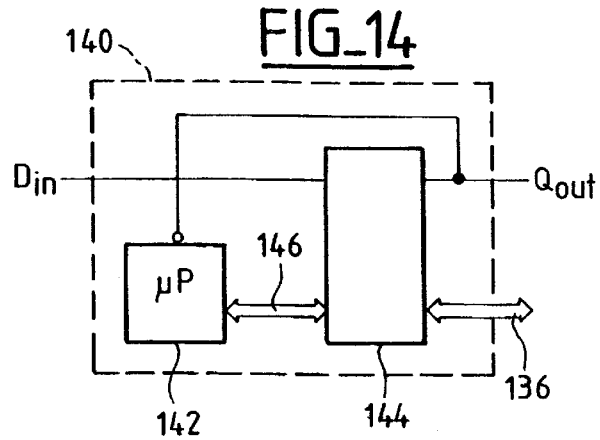
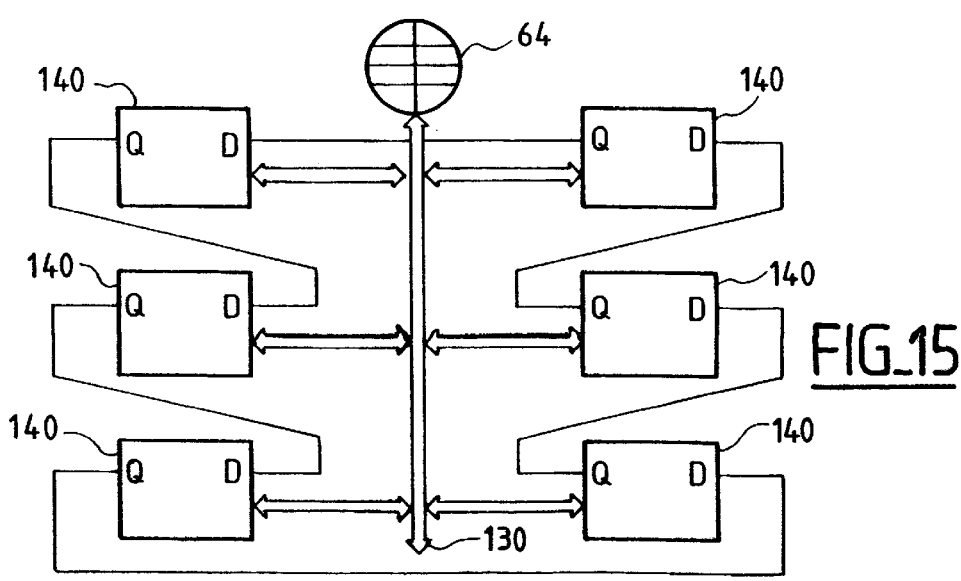

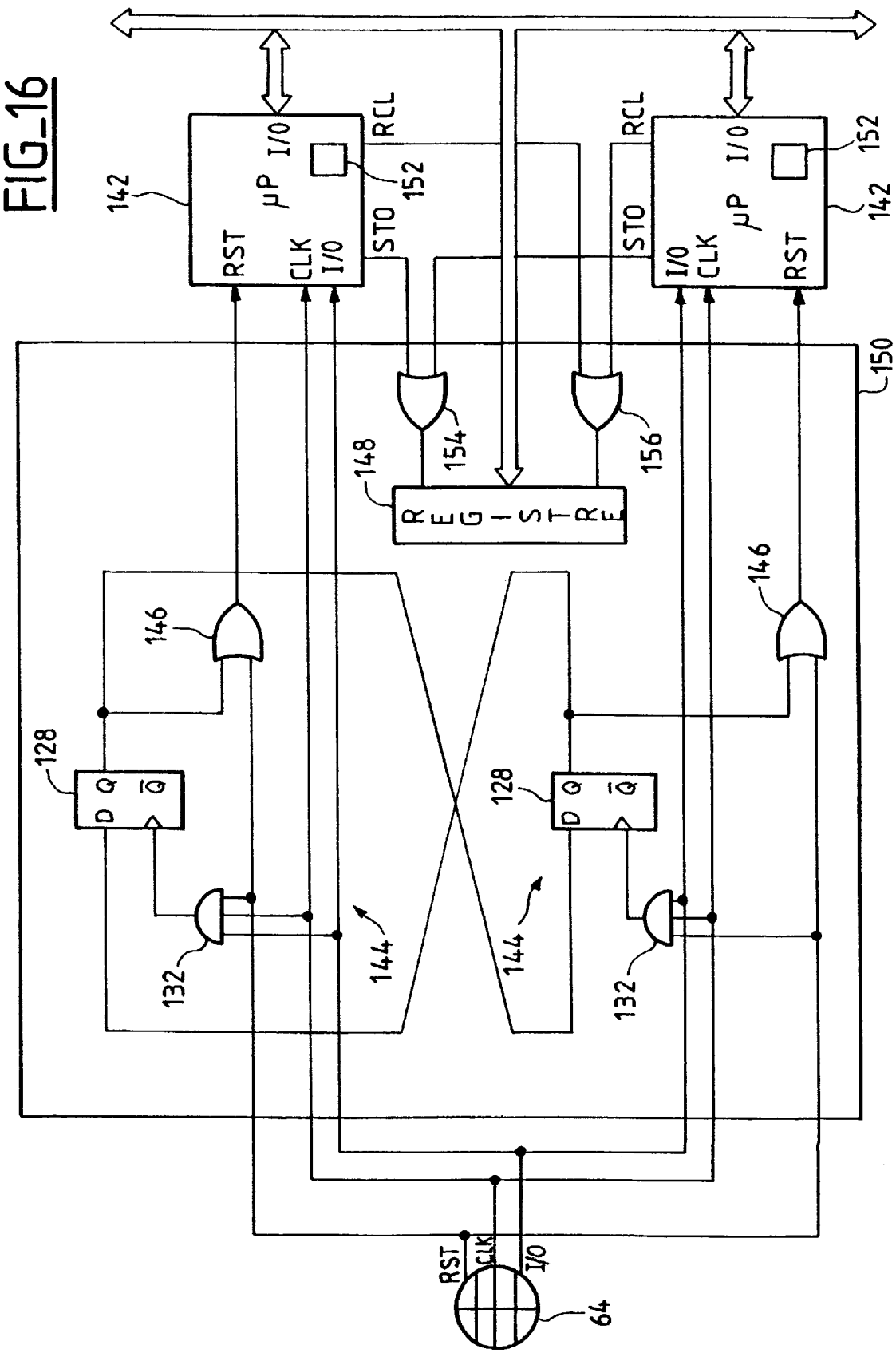
FIG_16

FIG_17
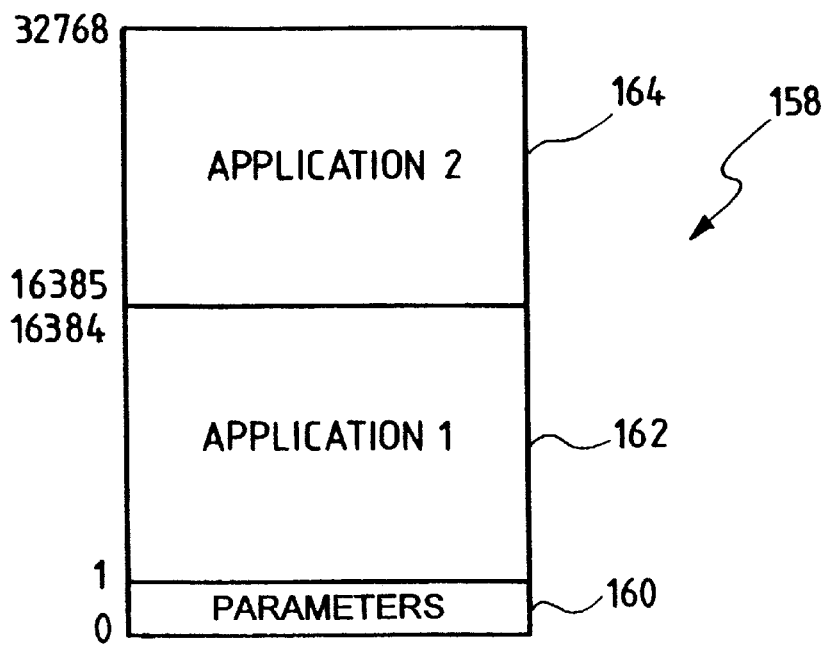
FIG_18
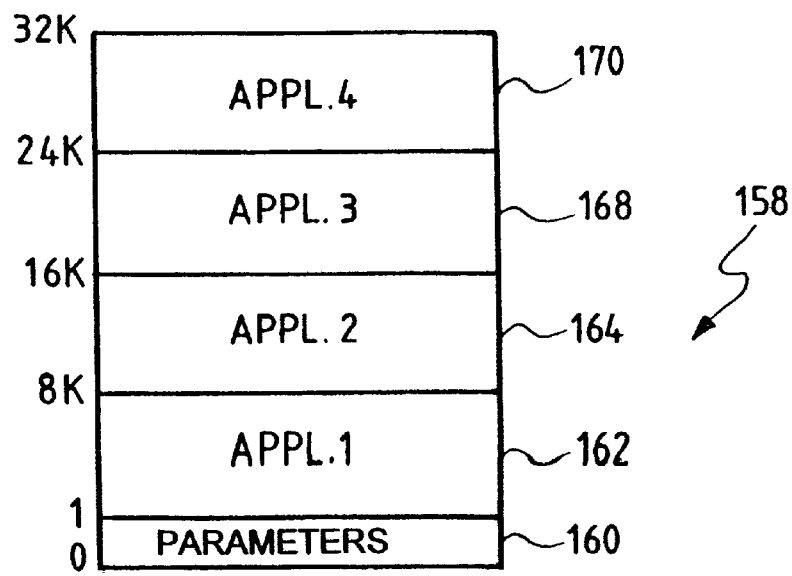

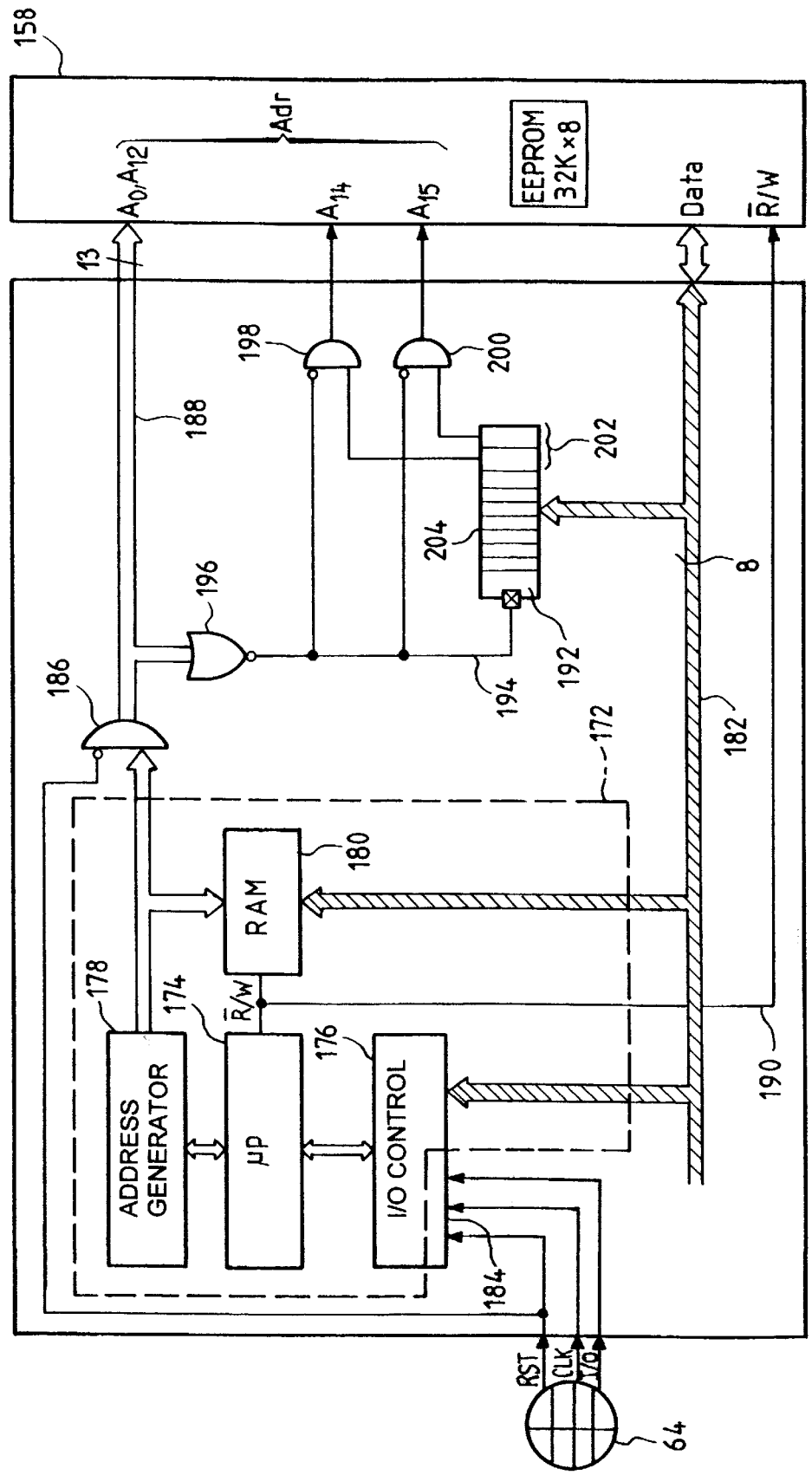

FIG_20
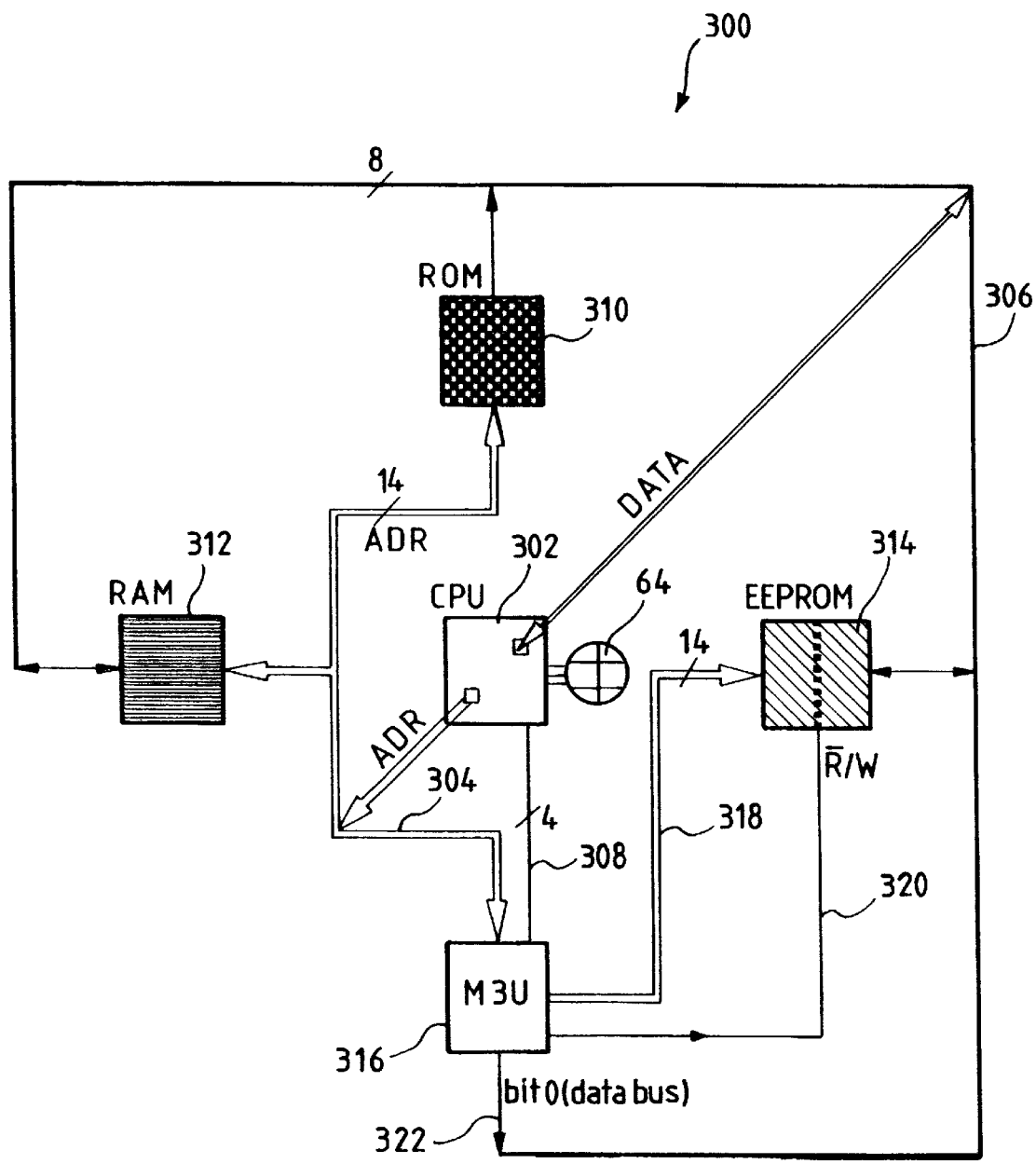

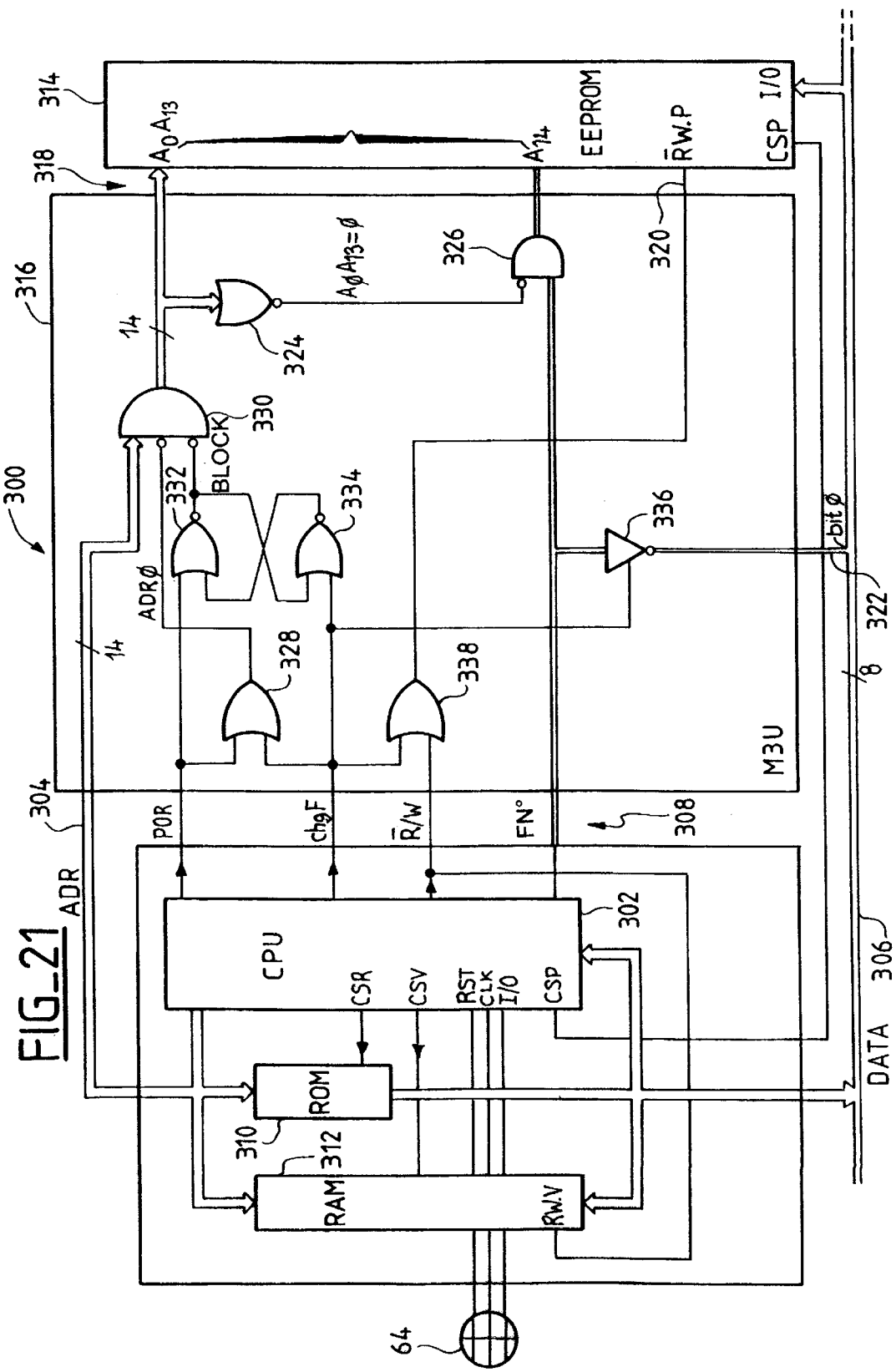
FIG_21

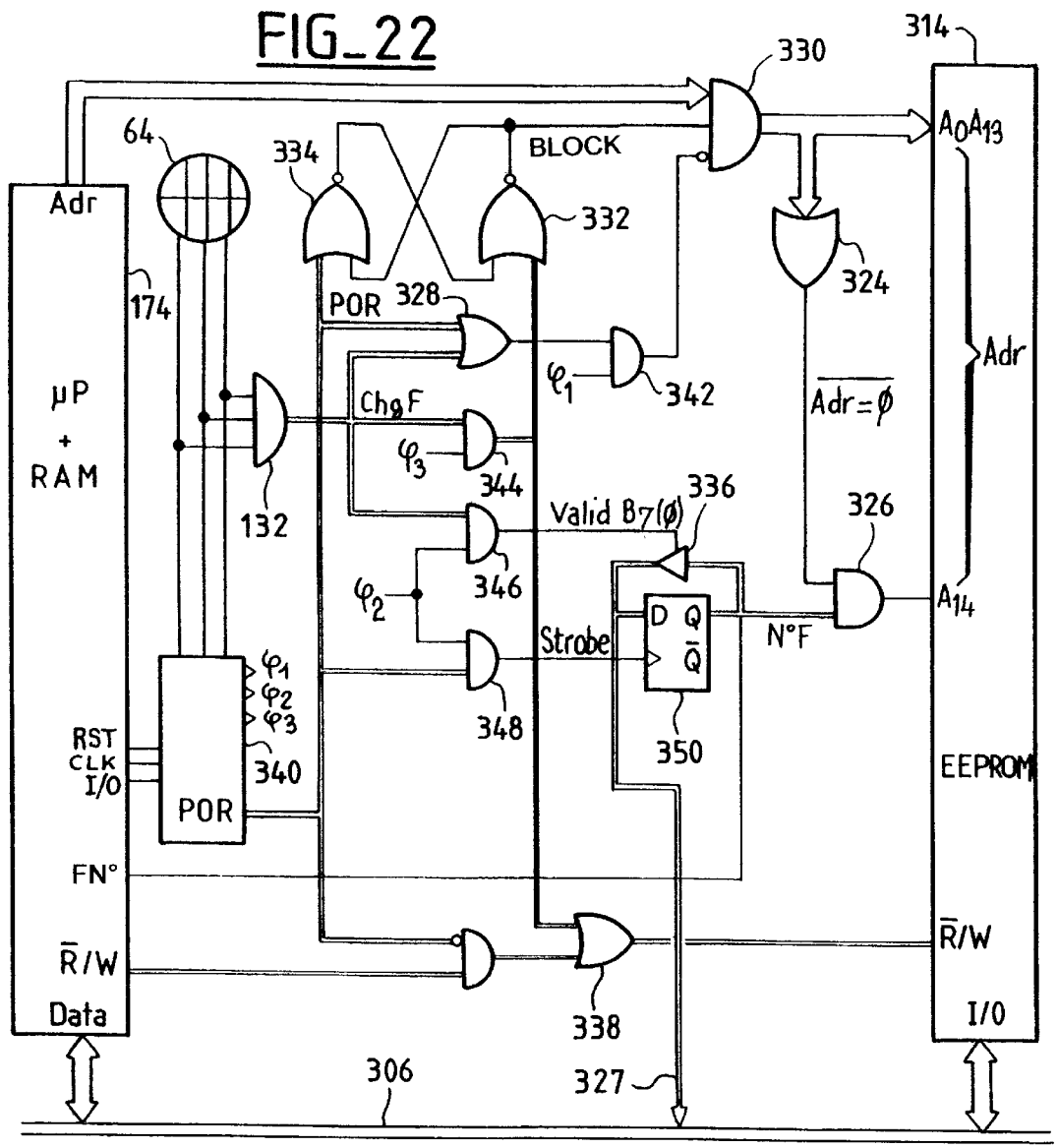
FIG_22
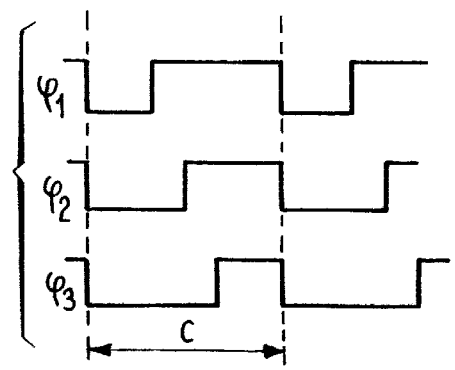
FIG_23

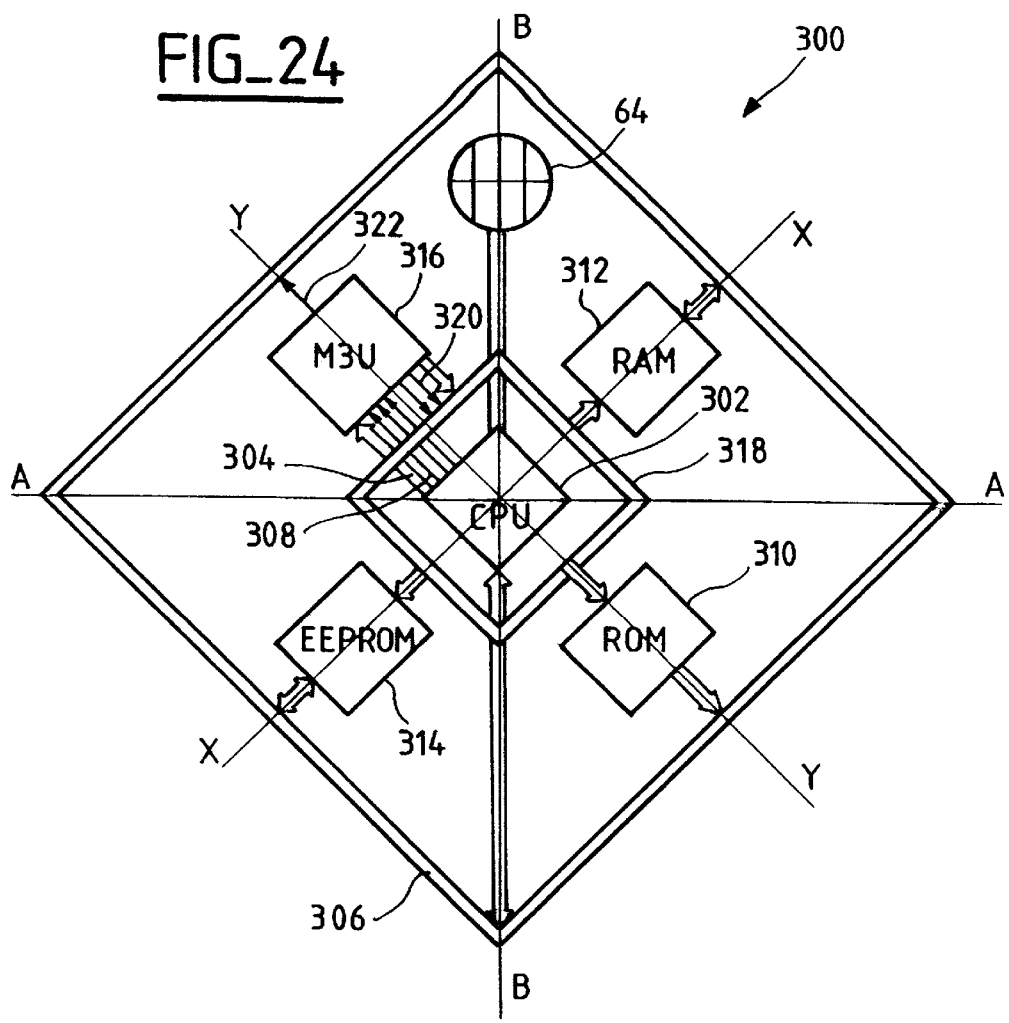
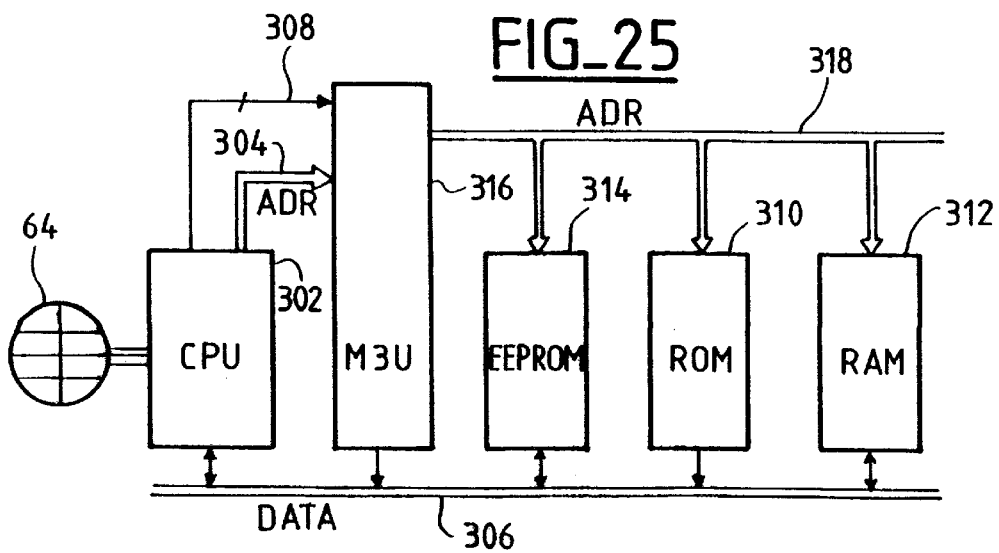

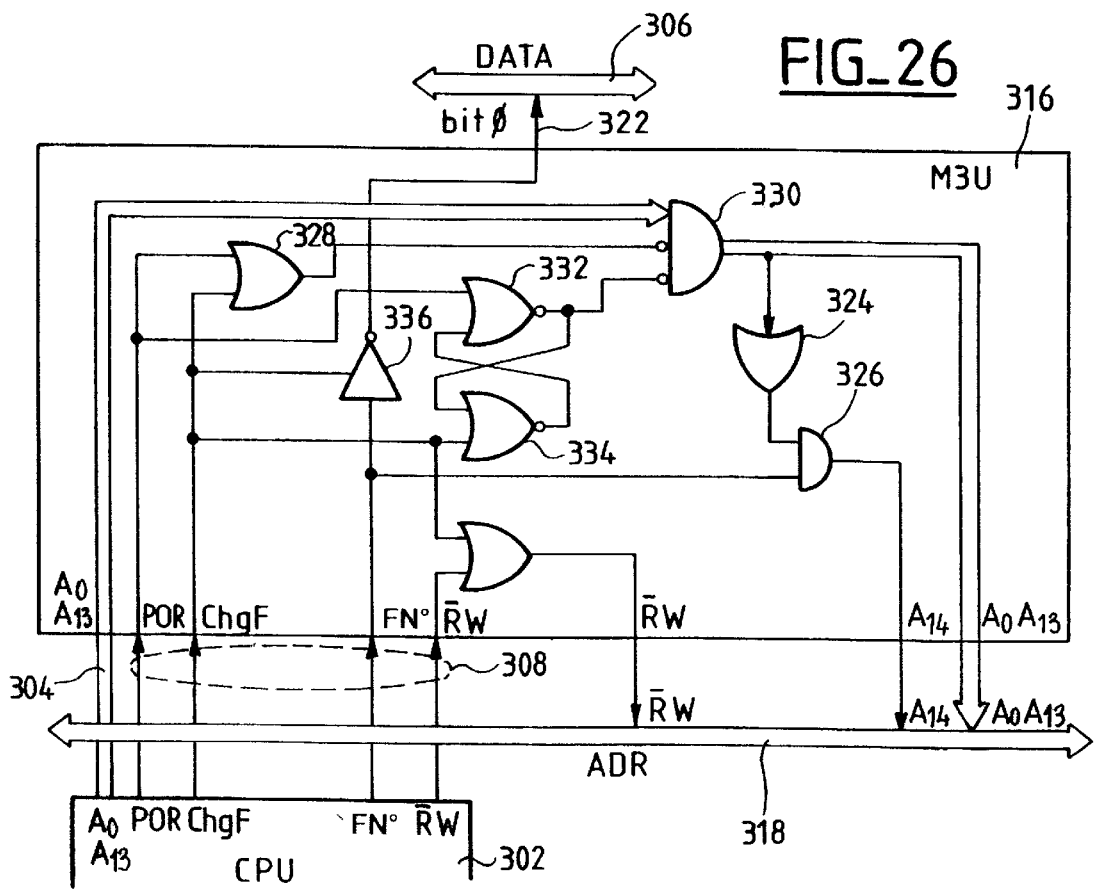
FIG_26
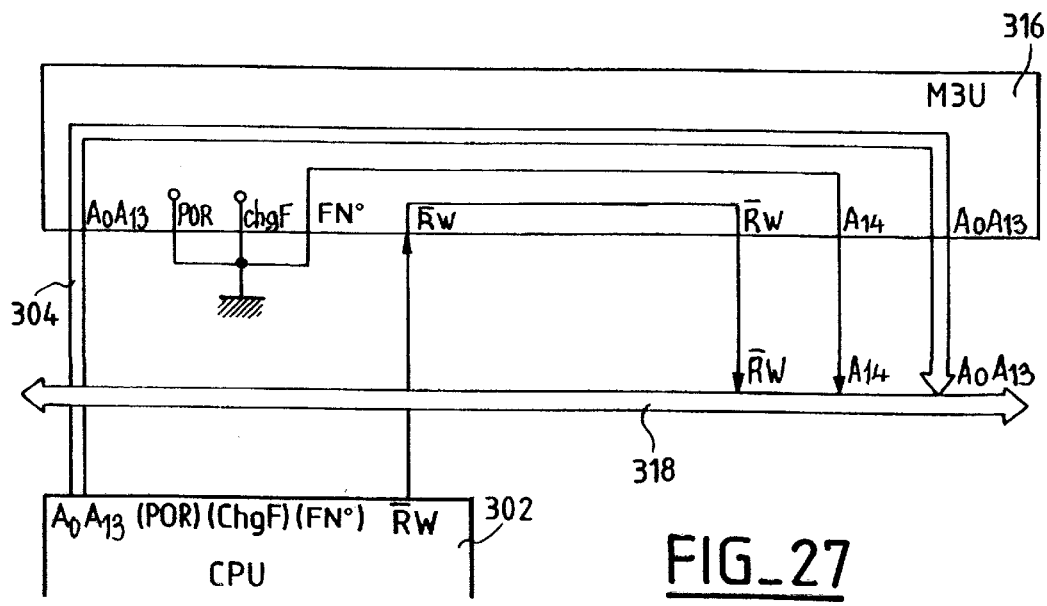
FIG_27

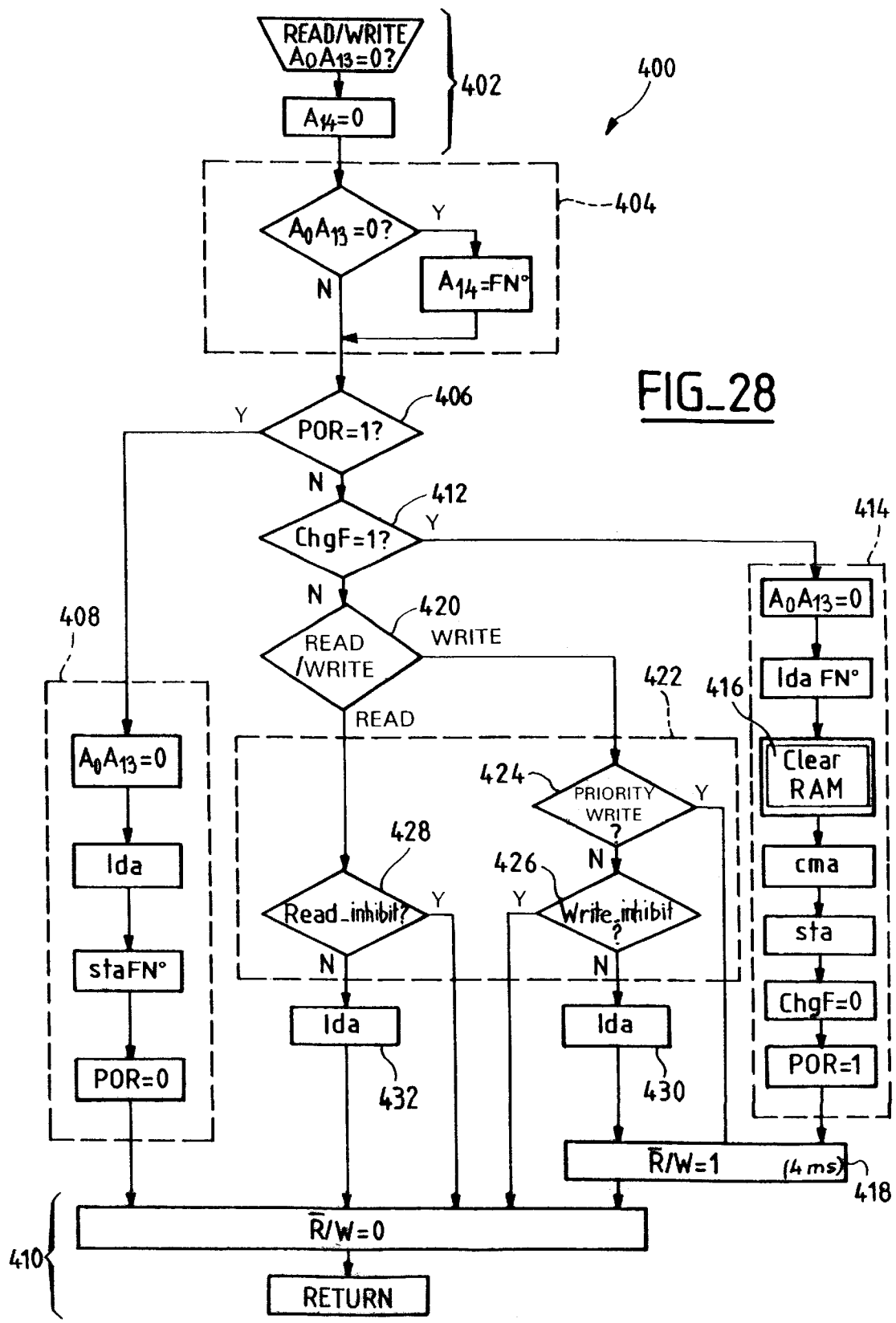
FIG_28

FIG_29
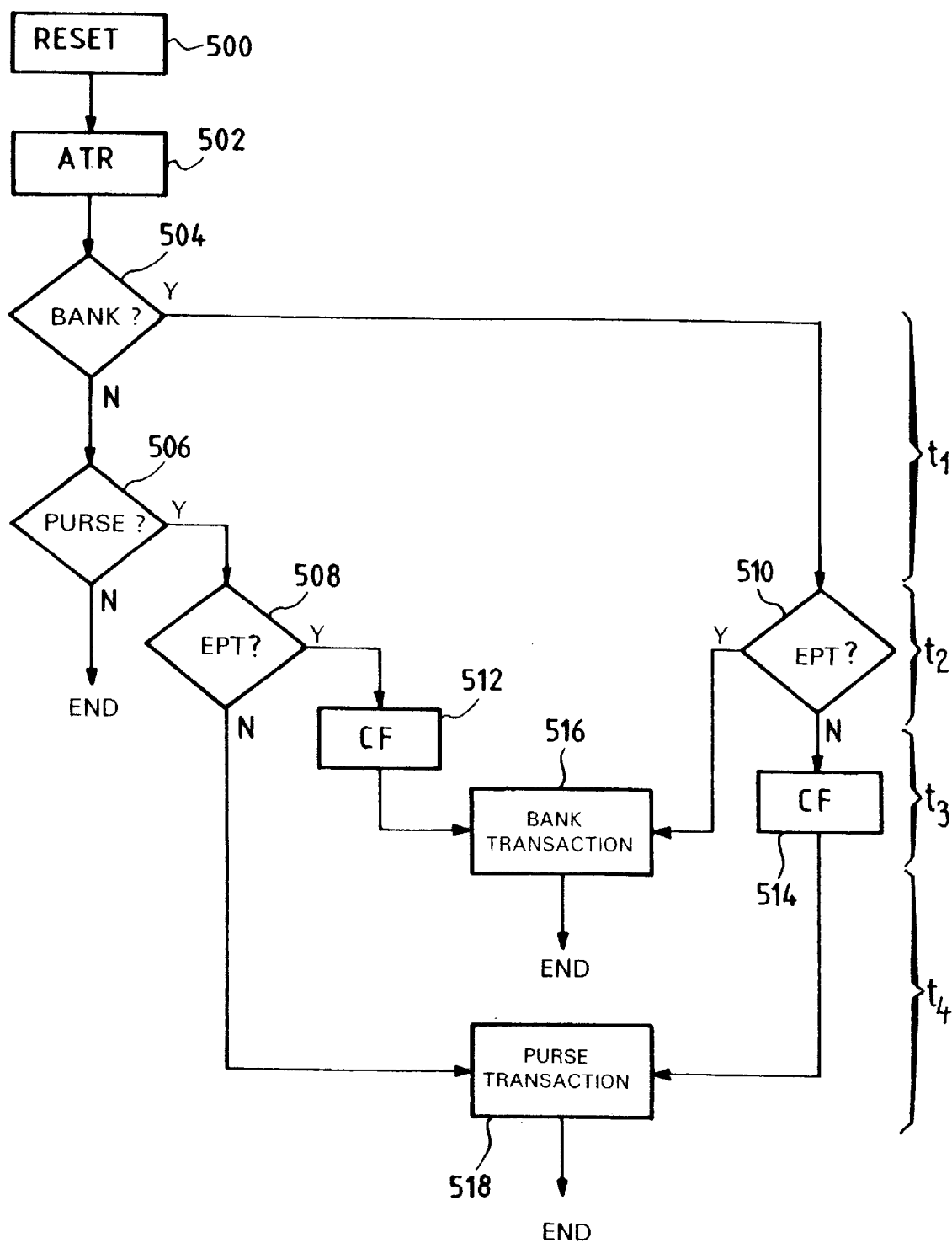

METHOD AND SYSTEM FOR USING A MICROCIRCUIT CARD IN A PLURALITY OF APPLICATIONS

BACKGROUND OF THE INVENTION

The invention relates to microcircuit cards.

Nowadays, these cards are used in numerous applications such as payment at a point of sale (known as the "bank card" application), public telephones, paying for parking, paying for TV, mobile telephones (GSM), health services, public transport, or electronic purse.

These applications are becoming more and more numerous, and their use is becoming more and more widespread.

Each of these applications is associated with a specific card: a bank card, a phone card, a parking card, an IC card for a television decoder, a SIM card for GSM telephony, etc.

One of the problems encountered in daily use of such a variety of cards lies in such-and-such a card of a type required by any specific one of these applications being accidentally unavailable, whether because it has been forgotten, because it is empty or has run out, or because it is invalid or has expired.

This problem is made worse by the fact that certain types of card are sometimes poorly distributed, or are used so rarely that it is quite likely they will not be in the user's pocket at all times. A typical case is that of parking cards, which are issued and usable in any one given city only, and for which a need can arise when the user is far away from any sales point that is open.

To remedy that drawback, proposals have been made to provide so-called "multi-application cards", e.g. making it possible to pay for a public telephone by means of a bank card.

Such multi-application cards are technically feasible, but in practice they are administratively very difficult to implement, as has been demonstrated by numerous pioneering attempts ever since the invention of the IC card itself.

OBJECT OF THE INVENTION

One of the objects of the present invention is to remedy that difficulty, by making use of two technical characteristics of contemporary microelectronics that are already implemented in modern microcircuit cards, specifically the presence of a reprogrammable memory of the EEPROM type, and the presence of a microprocessor.

SUMMARY OF THE INVENTION

More precisely, the method of the invention which seeks to enable a microcircuit card to be used in a plurality of applications comprising a default application and at lest one target application, includes the following steps: the card, initially configured for the default application, is coupled with a terminal of the default application; a special transaction is executed, reconfiguring the software of the card for the target application in such a manner that the card as reconfigured in this way emulates a card specific to the target application; the reconfigured card is coupled with a terminal of the target application; and a target-application transaction is executed.

Subsequently, provision is made for steps of coupling the card as reconfigured for the target application with a terminal of the default application, and for executing another special transaction that causes its software configuration to return to the default application.

In other words, under the control of its main program, and on receiving an order from a working terminal that has been suitably adapted for this multi-functionality, the card can be "reconfigured" so as to functionally emulate the missing card.

Once equivalent to the missing type of card (physically of course, but above all in terms of software), i.e. equivalent to a card for the target application, the original card can be used to perform the desired transaction (in the target application).

After being used in the target terminal, and on being returned to its original terminal, the card will receive therefrom an order to "configure" itself back to its original type.

Most advantageously, the default application is a SIM card application for a GSM radiotelephone, and the target application is an application of the token-carrier type.

Given the very large number of GSM telephones in circulation, it is irritating (because it seems paradoxical) for a user to observe that a presently-needed parking card is not available even though another microcircuit card such as the card for controlling of the radiotelephone is indeed to hand, with said card generally being inserted in the radiotelephone and generally being switched on.

Under such circumstances, the invention makes it possible to give the user a way out, by taking advantage of the availability of a powerful telecommunications network (the radiotelephone network), itself connected to the vast network constituted by the switched telephone network (STN).

In another implementation, the default application is a bank card application, and the target application need not only be a token-carrier type application, but can also a SIM card type application for GSM radio-telephony.

Or indeed, the default application can be an electronic purse type application, with the target application being a bank card type application enabling said electronic purse to be refilled.

Most advantageously, in order to avoid any interference between applications, provision is also made to apply a general reset operation to the RAM zone of the card each time its software configuration is changed. When the card has read/write memory, this general reset includes erasing the read/write memory.

This general reset can be performed in various ways: by applying a signal on a special control line; by enabling a memory address gate; or indeed by executing a specific sequence of instructions, in particular instructions of the card's operating system, instructions of applications software stored in the card, or indeed instructions in the microcode of the card's processor.

Advantageously, the card has non-volatile memory that is subdivided into distinct zones that are respectively usable for each application exclusively, and configuring the card for any one of the applications forces addressing to remain within the corresponding zone of the configured application until the card is reset. In addition, the non-volatile memory may also have a single common zone, that is addressable in a plurality of card configurations, and that receives parameters to be transferred between successive applications corresponding to said configurations.

The card also provides a system for implementing the above method, and comprising: microcircuit cards including means enabling the default application to be executed, means enabling the target application to be executed, and switch means enabling the card to be configured on command either as a default application card or as a target application card; default application terminals suitable for executing transactions of the default application and also a special transaction suitable for applying a reconfiguration command to reconfigure the card for the target application; and target-application terminals suitable for executing target-application transactions.

Advantageously, the default-application terminals are also suitable for executing another special transaction suitable for applying a command to the card for causing it to return to the default-application configuration.

They may also include control means made available to the bearer of the card enabling the bearer to initiate said special transaction or said other special transaction.

Advantageously, the card has a non-volatile memory element, in particular a non-volatile D-type bistable, that conserves in permanent manner data identifying the current software configuration (function number) of the card, and/or a memory element, in particular a D-type bistable, storing said data throughout the duration of the session.

In another particular implementation, the switch means comprise means that produce synchronization signals for sequencing the operations governing resetting of the card and changing its function.

Similarly, it is possible to provide means for jointly paginating all of the memory matrices of the card, whether volatile or otherwise, and whether programmable or otherwise.

BRIEF DESCRIPTION OF THE DRAWINGS

Other characteristics and advantages of the invention appear from the following detailed description of various implementations given with reference to the accompanying drawings, in which the same numerical references are used to designate elements that are functionally similar.

FIG. 1 is a diagram showing the various means and players in the method of the invention.

FIG. 2 is a block diagram showing the structure of a microprocessor token-carrier type circuit.

FIG. 3 is a block diagram showing the typical organization of the circuits in a GSM radiotelephone.

FIG. 4 is a block diagram of a microcircuit of a card of the invention.

FIG. 5 shows an embodiment of the subassembly of the FIG. 4 microcircuit that is dedicated to the token carrier application.

FIG. 6 shows a variant embodiment of the FIG. 4 circuit.

FIG. 7 shows a variant embodiment of the circuit of FIGS. 4 and 6.

FIGS. 8 and 9 show two possible variants of a circuit combining the various switch functions in a single component.

FIG. 10 shows an example of a circuit implementing the switch component of FIG. 9.

FIG. 11 shows an embodiment enabling a selection to be made between an indeterminate number of different functions.

FIG. 12 shows another form of circuit enabling selection to be performed between an indeterminate number of different functions.

FIG. 13 shows the structure of a switching circuit.

FIG. 14 shows the switching circuit of FIG. 13, associated with a processor circuit specific to an application.

FIG. 15 shows an example in which six circuits of the kind shown in FIG. 14 are associated in such a manner as to create a six-function IC card.

FIG. 16 shows a variant of FIG. 12, further including an inter-application transfer register.

FIGS. 17 and 18 show memory configurations with parameter transfer, respectively for a two-application system and for a four-application system.

FIG. 19 shows a circuit incorporating the memory configured in the manner shown in FIG. 17.

FIG. 20 is a block diagram of the circuits of a card implementing the teaching of the invention.

FIG. 21 shows in greater detail the structure and interconnection of the various functional blocks of FIG. 20.

FIG. 22 shows a variant of the FIG. 21 circuit.

FIG. 23 is a timing diagram comparing three sequencing phases for the circuit of FIG. 22.

FIG. 24 is a variant of the FIG. 20 block diagram.

FIG. 25 is equivalent to FIG. 24, using a linear representation.

FIG. 26 shows in greater detail how the central processor unit and the memory manager circuit of FIG. 24 are interconnected in a hardware implementation.

FIG. 27 shows how the FIG. 26 interconnection can be modified in a software implementation.

FIG. 28 is a flow chart showing how write or read memory access are managed in the context of the invention.

FIG. 29 is a flow chart showing the operating principles of a reader.

DESCRIPTION OF THE PREFERRED EMBODIMENTS

FIG. 1 shows the organization and the general operating sequence of the method of the invention.

By way of example, a GSM radiotelephone card (SIM card) is described that can be used by the method of the invention in the context of a token-carrier type transaction such as a transaction for paying for parking where payment is performed by deducting units (or "tokens") from a microcircuit card.

The subscription taken out by a user 10 from the company 12 operating the user's radiotelephone 14 includes not only general radiotelephone service, but also a special service, e.g. payment for parking, where the amount will be included as a specific item in the monthly listing of telephone consumption received from the operator 12 (billing represented by 16).

After parking a car close to an electronic "pay-and-display" parking meter machine 18 programmed to accept payment from prepaid cards issued by the city 20 (e.g. cards of the "Paris Card" type), the driver might find that no usable parking card is available or that the card is exhausted or invalid.

To perform the payment required by the machine, the user then engages a "parking" command on the radio-telephone, e.g. by pressing on a button 22 or by selecting an option in a menu giving the optional services offered by the telephone operator. This command causes the SIM card 24 of the radiotelephone to be "reconfigured" (see below) as a parking card of the "Paris Card" type.

The user then extracts the card 24 from the radio-telephone and inserts it (arrow 26) into the machine 18, which perceives the card as being a parking card, and the card is then operated and debited as such.

The user then reinserts the card 24 (arrow 28) into the radiotelephone 14 where it is read by the radio-telephone which automatically reconfigures it for the GSM function.

Once the parking total 32 has reached a predetermined amount (that is sufficiently large so as to optimize billing costs), the radiotelephone 14 takes advantage of a normal telephone call to inform the operator 12 (arrow 30) not only about the parameters of the call which has just taken place, but also the value of the parking total 32 at that time.

The same amount, credited by the operator 12 in favor of the city 20 (arrow 34) may possibly include a compensatory commission since the city has been saved the price of manufacturing and distributing a card specifically for parking.

FIG. 2 is a block diagram showing the general structure of a token-carrier type component having a microprocessor: an EEPROM memory component 36 is installed on the output bus 38 of the microprocessor 40, while the input bus PE 42 receives data coming from the memory 36 and from the fuse 44.

FIG. 3 is a block diagram showing the general organization of a GSM radiotelephone. This comprises a microprocessor 46 connected to a both-way bus 48 communicating with some number of members: analog-to-digital and digital-to-analog converters 50 and 52 operating the handset 54, a keypad 56, analog-to-digital and digital-to-analog HF converters 58 and 60 operating the antenna 62, and finally a connector enabling both-way communication to be established with the contact area 64 of the IC card of the radiotelephone (SIM card).

FIG. 4 is a block diagram showing the general structure of a card of the invention, i.e. a card that is capable selectively of performing both the SIM card function for GSM and the token-carrier card function.

This card communicates with the outside world via a contact area 64. A first functional block 66 enables the token-carrier application to be executed and a second functional block 68 enables the GSM application to be executed. A general decoder 70 communicates with the contacts 64 via three lines: I/O 72, CLK 74, and RST 76, which lines are naturally in addition to a power supply line VCC and a ground line GND. A common bus 71 interfaces the decoder with the two functional blocks 66 and 68.

The assembly is under the overall control of a variable CF (card function) which can take two values: 0 (GSM function) or 1 (token-carrier function). This choice is stored in a memory location illustrated to clarify the drawing as being in the form of a 1-bit EEPROM memory referenced 80, but which in practice can be constituted by a location in the main memory at an arbitrary address.

This variable CF is changed by the user each time the user presses the button 22 (FIG. 1) on the radio-telephone (or activates an appropriate option in a menu). The software supervisor loop in the radiotelephone periodically examines the state of the button and on each occasion that the button 22 is pressed it sends a command to the card which is recognized by the decoder 70 to produce a CHANGE__FUNCTION signal on an output 82, which signal is applied to an EXCLUSIVE-OR gate 84 which writes the new card function CF in the memory 80 by complementing the previous state of the card function. The card function CF available on the output 86 of the memory 80 makes it possible to operate alternately in token-carrier mode and in GSM mode via respective enable inputs 88 and 90 of the circuits 66 and 68, which inputs are interconnected via an inverter 92.

This changeover between the two functions can also be implemented in software form. Thus, if the commands received by the card are temporarily stored in a register CMD, the changeover algorithm can be summed up by the following sequence of instructions that are expressed in metalanguage:

```
while Button On/Off
   wait CMD
   CF=CF⊕(CMD=Change_Function)
   On CF Call Action(CF)
wend
```

The function Action(CF) steers the sequence towards an action of type 0 (GSM) or type 1 (token carrier) depending on the value of the card function CF:

```
if CF=0 then Function_0 (GSM)
if CF=1 then Function_1 (token carrier)
Return
```

FIG. 5 shows an example of the block structure 66 for controlling a token-carrier function. The block 66 comprises a memory 94 which is cyclically addressable by the an address counter 96. The counter has 256 steps, it has a clock input UpAdr and a clear input ClAdr under the control of a driver circuit 98, itself interfaced with the general decoder 70 by the bus 71. A detector 100 gives the address range [0,95] referred to as the "fuse zone" in which writing is authorized only if the fuse 102 is still intact. The write controller 104 filters write commands upstream from the R*/W input 106 of the memory 94. The write controller 104 acts via the gate 108 to authorize any write request providing the fuse 102 is intact. Otherwise write authorization depends on the value of the current address, as given by the detector 100.

These functions can be implemented in software form by the following sequence of instructions:

```
if current Address>255 then force Address to zero
Test the Command:
   if the Command is Clear Address (ClAdr),
      then Clear the Address: Return
   if the Command is Increment Address (UpAdr),
      then Increment the Address: Return
   if the Command is Read the Memory,
      then Read_Memory: Return
if Fuse Intact, then Write_1: Return
if Address Outside Fuse Zone, then Write_1
Return
```

When it is desired to use the card as a token carrier, in this example for paying for parking, the process of operating the card comprises (i) initially configuring the GSM card as a token-carrier card with the agreement of the radiotelephone operator and of the city; and (ii) use proper of the card by deducting the tokens that have been stored therein.

This process can be summarized by the following sequence of instructions:

```
while On
   wait CMD
   while CMD = Change_Function AND CF = 0
      Radiotelephone calls Authority (city)
      Authority (city) creates VPC ("Virtual Parking Card")
         [VPC] = Fuse_Zone No., content Token_Zone
      Authority transmits VPC to Radiotelephone
      Radiotelephone copies VPC into dedicated zone
      CF = 1
   wend
   CF = CF ⊕ (CMD = Change_Function)
```

```
        On CF Call Action(CF)
        Radiotelephone increments Total
        Total <- Total + debited Tokens
        while Total > 100 units
                Radiotelephone calls Authority (city)
                Radiotelephone sends Total
                Total <- zero
        wend
wend
```

Numerous variant embodiments of the invention can naturally be envisaged.

Thus, FIG. 6 is a variant of FIG. 4 in which the mechanism for switching between the two functions is reduced to an emulated D-type bistable, assuming that this member is implemented using technology identical to that of the main memory (EEPROM). The bistable 110 is triggered via its clock input 112 by the CHANGE_FUNCTION signal 82 issued by the general decoder 70. The two complementary outputs Q and Q* of the bistable 110 are connected to the respective enable inputs 88 and 90 of the token-carrier block 66 and of the GSM block 68, which are in communication with the decoder via the both-way bus 71.

In addition, the pair of applications comprising GSM and token carrier, and in particular GSM and parking payment, is naturally not limiting, and other pairs of applications could also be envisaged.

Most particularly, the main function of the multi-function card of the invention (i.e. the default function for which the card was initially issued and configured) could be a bank card (BC) type function, with the second function being a GSM function.

Under such circumstances, after the multi-function card of the invention has been manufactured and prior to it being "personalized", cards are loaded with a BC type first application. It is in this state that the cards are supplied to a bank by the card manufacturer: at this stage, the cards are thus bank cards and approved as such by the bank.

The next step consists in personalizing the cards by recording authorization keys therein. This guarantees that these cards operate in compliance with the rules specific to the banking application, and to this bank in particular.

The bank then issues the cards to its customers, who therefore can benefit from the ability of these special cards, optionally, to acquire a second function.

To do this, the cards are loaded by a mobile telephone operator with a GSM application beside the BC application that has already been recorded indelibly.

The functions implemented can be summarized by the following sequence of instructions:

```
        while Button On/Off
            wait CMD
            gosub LoadFunctionBC
            gosub LoadFunctionGSM
            if CF = 0 then GSM
            if CF = 1 then BC
            if CMD = "Change_Function" then CF = CF*
        wend
        GSM:

gosub Alarm
            Function GSM proper
            Alarm = Status                          (alarm level)
            Return
        BC:

Function BC proper
            Alarm = Status                          (alarm level)
            Return
        Alarm:

if Alarm=0 then Return
            call Bank, GSM
            dialog Bank <-> GSM
            Alarm = 0
            Return
        LoadFunctionGSM:

if GS = 1 then Return
            if "Key(LoadGSM) = OK" then Return
            Download ApplicationGSM
            GS = 1                                  (GSM function activated)
            CF = 0
            Return
        LoadFunctionBC:

if BC = 1 then Return
            if "Key(LoadBC) = OK" then Return
            Download ApplicationBC
            BC = 1                                  (BC function activated)
            CF = 1
            Return
```

In particular, such cards can be issued by bank or credit establishments for use, in addition to conventional payment for purchases on the site of sale, for operations of secure sale by correspondence or electronic commerce (by videotex or Internet). Under such circumstances, the user who seeks to order an article, instead of keying-in the bank card code number (PIN number) via a terminal (with all the risks of dissemination and fraud that that implies) can then use the special bank card, reconfigured as a GSM card, to call via the radiotelephone a voice server for checking authorization of card debiting and order validation.

FIG. 7 shows a variant of the circuit adapted to an assumption whereby, by convention, the change-function order corresponds to applying a "1" simultaneously on all three inputs I/O, CLK, and RST of the contact area 64.

The instruction decoder can thus be constituted by a simple AND gate 114 whose output 116 causes the state of an emulated D-type bistable 110 to be changed (said bistable being made using EEPROM technology, with circuitry that is not shown, but that comes within the competence of the person skilled in the art). Two gates 118 and 120 operate in anti-phase depending on the state of the bistable 120, the clock inputs CLK of the two chips 66 and 68, while the remainder of the bus (the three lines I/O, RST, and VCC 122, 124) is connected to the contact area 64.

In a variant, instead of switching on selection of the clock signal CLK, it is possible to switch the reset input RST of one or other of the chips 66 and 68, or indeed the I/O input and/or or output.

FIG. 8 shows a circuit using a single component 126 that combines all of the functions associated with switching. In addition to the terminals VCC and GND, this component has three input terminals I/O, RST, and CLK, together with two output terminals CM1 and CM2 (for "CLK-Microprocessor-1 or -2). The component houses a bistable 128 and a special power supply circuit 130 which serves to cause the bistable 128 to operate in EEPROM mode, so that it delivers, depending on its state, a signal on pin CM1 or CM2. The component 126 also has a three-input AND gate 132 connected to the contact bus I/O, CLK, and RST, which serves to detect the function-change order which, by convention, is encoded "111".

FIG. 9 shows a component referenced 134 which is a variant of the component 126 of FIG. 8 and which makes it possible, using the same inputs, to produce selectively a signal RM1 or RM2 (for "Reset-Micro-processor-1 or -2"), when it is desired to select one or other of the microprocessors by permanently forcing the RST input of the non-selected microprocessor.

FIG. 10 shows an embodiment implementing the switch 134 of FIG. 9. As can be seen, the card has three standard members, namely the chips 66 and 68 corresponding to each of the functions that it is desired to implement selectively, and the contact area 64. These members are interconnected by means of the component 134 described above with reference to FIG. 9 and by a five-line bus 136 having lines I/O, CLK, RST, VCC, and GND. Naturally, if a higher degree of integration is implemented, it is technologically possible to unite all three members 66, 68 and 134 on the same chip.

FIG. 11 shows an embodiment making it possible to switch between an arbitrary number of functions, and in particular a number greater tan two, unlike the embodiments described above.

The circuit is constituted by a series of identical chips 138 each including, in addition to members specific to each application (GSM, token carrier, bank card, etc.), a switch component 134 of the kind shown in FIG. 9, in particular with the gate whose purpose is to detect the change-function order.

Each of the blocks 138 is provided with inputs FR (for "False Reset") and VR (for "Verified Reset"). The input FR of the first block 138 is connected to the RST contact of the contact area 34, while the input FR of each following stage is connected to the output RM2 of the switch 134 of the preceding stage. The input VR which enables the functional elements of the block under consideration to be deactivated is itself connected to the output RM1 of the switch 134 of its own stage.

This serves to chain blocks 138, with block selection taking place sequentially on each occasion that a change-of-function order is applied.

FIG. 12 shows a circuit having two similar functional assemblies 140 dedicated to respective specific applications, each having a microprocessors 142 and an associated switch circuit 144.

The structure of the switch component 144 is shown in FIG. 13 and corresponds essentially to the component described above with reference to FIG. 9, having the emulated D-type bistable 128 and an AND gate 132 to detect the change-of-function order.

FIG. 14 shows a component 144 in the form of a functional block having an input Din, an output Qout, and a link firstly to the general bus 136 and secondly to the bus 146 of the microprocessor 142, having its RST line controlled by the gate 146 (FIG. 13). The two functional blocks 140 (switch 144 and microprocessor 142) can be integrated in a single component, optionally in the form of a universal chip, that can be personalized simply as a function of the desired application.

FIG. 15 shows the structure of a card having six such components 140 organized to constitute a six-function card that is almost universal in usage: for example it may comprise a bank card+an electronic purse+GSM+an identity card+an Internet card+a cryptographic module. Each of the blocks 140 is connected to a common bus 136; the D input of each block is connected to the Q output of the preceding block in a chaining order.

FIG. 16 shows a circuit derived from the above circuits in which the various applications that are used in succession can transfer parameters between one another via a register 148. This register is implemented using non-volatile technology, and in its simplest configuration is an 8-bit EEPROM register (with box 150 containing those elements implemented in EEPROM technology whose information state does not change between two uses of the card, and the same applies to the EEPROM memory zones 152 of the microprocessors 142). The zone 150 includes, in particular, the switching circuits 144 which are of the same type as those described above with reference to FIG. 13.

The register 148 is connected to the common I/O bus of the microprocessors, and its write input is constituted by the set of STO type outputs coming from the various microprocessors, as multiplexed by the gate 154. Similarly, each microprocessor can read the contents of the register by applying an RCL order, as multiplexed by the gate 156. In a manner that is characteristic of a variant embodiment of this invention, because there is only ever one microprocessor active at the same time in the card, there is no risk of conflict or collision in reading or writing, nor is there any risk in the invention of a microprocessor of order N writing or reading data in the parameter-passing register simultaneously with one (or more) microprocessors of order N'≠N being active.

Most advantageously, on each change of function, all of the circuits of the card are reset, specifically to avoid any interference between applications or any risk of data being transferred between them other than via the non-volatile register 148.

FIGS. 17 and 18 show a particular organization for the non-volatile memory that enables the same memory to house simultaneously both zones which are reserved to respective applications and the register for passing parameters between them (corresponding to the register 148 of FIG. 16). This particular logic organization serves to avoid creating a non-volatile memory space other than the EEPROM space 158.

For a two-application card, corresponding to FIG. 17, the EEPROM 158 is organized with a first zone 160 at address zero that is used for passing parameters between applications (corresponding to register 148 in FIG. 16), a zone 162 (addresses 1 to 16,384 in this example) reserved for application No. 1, followed by a zone 164 (addresses 16,385 to 32,768 in this example) reserved for application No. 2.

In the simplest embodiment described herein, both applications are of equal dimensions, however the person skilled in the art can, where appropriate, provide special address-decoding resources to make use of applications that are of dimensions that are different, or indeed very different. In this respect, it will be observed that it suffices to provide a small number of additional gates to be able to manage a variety of respective proportions between applications (½, 1/16, 1/128, etc.) and also a variety of numbers of applications coexisting on the same card (2, 4, 16, etc.).

The processor associated with this memory is configured (see below) in such a manner as to provide complete isolation between the two applications, i.e. the zones 162 and 164 can never be used simultaneously during the same session. This is to prevent any possible interference between the two applications.

As mentioned above, it is possible, most advantageously, to provide for the card to be reset (automatic stop, special instruction sequence, or disconnection) each time a change-of-function order is executed. This imposed disconnection erases the RAM in the card and eliminates any risk of parameters being passed from one application to the other via the RAM, thus guaranteeing isolation between applications.

It should be observed that this guarantee is naturally unlimited, and that the chip designed in this way will withstand indefinitely any attempt at logical attack. The present invention thus teaches a combination of means that are certain to achieve the desired object.

FIG. 18 corresponds to FIG. 17 but for the case of a card having four applications. In this example, in addition to the zone 160 for passing parameters (address zero), four distinct 8-Kbyte zones 162, 164, 168, and 170 are allocated to each of the four applications.

FIG. 19 shows a circuit for managing the memory shown in FIG. 18 with all of the desired guarantees as to isolation between applications. The security of each function is, in this manner, strictly that of its own software, without the additional function(s) adding any further risk, and this remains true in spite of the possibility of parameters being passed between applications.

This circuit is organized around a standard chip 172 comprising a microprocessor 174 associated with an input/output control circuit 176, an address generator 178, and RAM 180. This circuit makes use of data present in the non-volatile memory 158 via a data bus 182. The three lines (RST, CLK, and I/O) coming from the contact area 64 communicate with the microprocessor via the special both-way bus 184.

The address generator 178 provides the addresses required by the memory 158 under the control of a gate 186 designed to force the bus 188 to zero (which bus carries the thirteen least significant bits A0–A12 for memory addressing) in the event of an RST command being applied to the corresponding contact of the contact area 64.

The line 190 controls read/write operations both in RAM and in EEPROM, while the register 192 (parameter/function register) can be modified only via the signal 194 delivered by the gate 196. This signal 194 represents detection of the address zero on the bus 188, which has the effect of forcing to zero the two most significant address bits A14 and A15 via gates 198 and 200. The register 192 (which in practice is constituted by a fragment of the RAM 180 specific to the micro-processor) is loaded from the both-way data bus 182 each time the address zero is forced.

The data then available on the bus 182 at the outlet from the memory 158 represents the contents of the physical "zero" address, i.e. the contents of the register for passing parameters via non-volatile memory. This register 158 stores two bits 202 encoding the active application (Nos. 0, 1, 2, or 3), and six bits 204 for passing a parameter (naturally this format is not limiting).

Because total isolation is guaranteed between the applications while still allowing a parameter to be passed on input and output to or from an application, the invention can be made particularly advantageous when one of the applications is a cryptographic application, since this makes it possible to guarantee that cryptographic processing is executed in completely secure manner since no damage to the cryptographic process is possible by means of malicious instructions recorded in the mask for the main application.

In the context of a bank application, this cryptographic application can correspond, for example, to a function which enciphers the certificate number and possibly other parameters, with the result being stored at an address in the non-volatile memory (e.g. the address zero) where the parameters can be recovered by the bank application.

The sequence can thus be as follows:
a) conventional bank card processing (verifying bank identity, expiry date, stops, if any, solvency);
b) writing non-volatile parameters in address zero (bank identity, amount, date, certificate);
c) changing function: resetting the RAM matrices of the card to zero, and activating the cryptographic module; and
d) reading the contents of the memory at address zero, enciphering and remotely transmitting the result via the cryptographic module.

By way of example, the cryptographic software can be delivered in the form of a graphics mask covering half of the physical space corresponding to the EEPROM memory plane (which space was left untouched after initialization for the bank function).

To sum up, the system of the invention as described above presents the following four important distinctive characteristics:

1) Alternate processing for two applications (or more generally N applications): this processing is "alternate" in the sense that there is never any interleaving between two applications, each of them is executed separately, and all of the "live" elements of the card are reset (i.e. lose all information once powered-down) on each occasion that the system passes from one application to another. In addition, when applications make use of memory in common, the memory is partitioned into two distinct zones (top zone and bottom zone) which, given the structure of the addressing circuit, can never be addressed in succession during the same session, with changeover from one zone to another of the memory necessarily implying a change of function and thus that all of the live elements of the card have been reset, thereby avoiding any risk of interference between successively-called applications.

2) Erasing RAM: on each change of function, the RAM and all of the live functions (bistables, registers, stack(s), etc.) are erased (and indeed whenever the card is disconnected from the reader), thereby guaranteeing complete "isolation" between applications.

3) Parameter passing: communication between applications is strictly limited to interchanging data via non-volatile common space (since RAM is erased, no parameter can pass via RAM).

4) The number of the active function is taken into account: either automatically on each occasion that the card is powered, or else under the control of the commands received via the contacts of the card, or as generated by the microprocessor itself.

FIG. 20 is a block diagram of circuits 300 in a card implementing the teaching of the invention.

Essentially, a central processor unit CPU 302 is connected to the contacts RST, CLK, and I/O of the contact area 64, and communicates with the other circuits via an address bus ADR 304 (typically using 14 bits) and via a data bus DATA 306 (typically using 8 bits). The CPU 302 also generates four special control signals POR, ChgF, R*/W, FNo on a bus 308, which signals are described in greater detail with reference to FIG. 21.

Provision is also made, in conventional manner, for a read-only memory (ROM) 310, a read/write memory (RAM) 312, and a non-volatile memory (EEPROM) 314.

The ROM 310 and the RAM 312 are connected to the CPU 302 and are controlled in conventional manner via the address bus 304 and the data bus 306.

In contrast, access to the EEPROM 314 is managed by a modest memory management unit (M3U) 316 that is specific to the invention.

The M3U 316 is connected to the EEPROM 314 via a 14-bit address bus 318 and a write control line R*/W 320. It is also connected to the least significant bit line (bit 0) of the data bus 306 by a line 322 enabling it to force the value of this bit.

FIG. 21 shows the structure of these various elements in greater detail together with the signals interchanged between them.

The CPU 302 performs three essential functions:

1) that of an address generator, operating directly for the ROM 310 and the RAM 312, and via the M3U 316 for the EEPROM 314;

2) that of generating the four special signals POR, ChgF, R*W/, and FNo on the bus 308 for application to the M3U 316; and 3) that of a processor for executing various calculations and processing.

The various abbreviations used in this figure are as follows:

POR: Power-On Reset (an order to reset the circuit when power is applied thereto, this order occurs once only during a session);

ChgF: change function, controlled either internally by the CPU 302, or externally, e.g. by simultaneous application of signals on the three contacts RST, CLK, and I/O;

R*/W: an order to write in memory;

FNo: function number (0 or 1);

CSR: Chip Select for the Read only memory ROM;

CSV: Chip Select for the volatile RAM;

CSP: Chip Select for the Programmable non-volatile memory;

R*/W.V: write to RAM;

R*/W.P: write to programmable non-volatile memory;

A0A13: the 14 least significant address bits of the EEPROM 314;

A14: the most significant address bit of the EEPROM 314;

I/O: the eight data bits read or written from or to the various memories;

bit0: the least significant bit of the data bus DATA;

ADR0: a signal indicating that the CPU 302 is addressing address zero of the EEPROM 314 (i.e. the zone for passing parameters);

BLOCK: address blocking so as to prevent the address pointer of the EEPROM 314 from changing position; and HiZ: validating the function number (value "FALSE") to enable it to be written to the most significant bit position of address zero in the EEPROM 314 (parameter-passing zone).

The M3U 316 is constituted by a very small number of gates 324 to 338 for managing access to the EEPROM 314 by the CPU 302 in complete security concerning isolation between the various applications concerned, since they can communicate with one another only via the parameter-passing zone which is situated at address zero of this memory.

The gates 324 and 326 which control the most significant bit A14 enable EEPROM 314 address zero to be forced so as to address the parameter-passing zone, the gate 326 forcing memory address bit A14 to a value (0 or 1) corresponding to the function number FNo.

The gates 328 and 330, in combination with the gates 332, 334 for storing state, operate at the moment of general reset (POR) which occurs, as explained above, each time function is changed. At this moment, the addresses A0A13 and the address A14 are forced to zero, thus pointing to the parameter-passing zone and making it possible to recover any parameters left in said zone by the previously-used application.

The switch 336 and the gate 338 act to control the writing of parameters that are to be transferred in the parameter-passing zone of the EEPROM 314.

FIGS. 22 and 23 show a variant embodiment of the circuit of FIG. 21.

In this variant embodiment, the successive steps are synchronized by a three-phase clock producing three clock signals $\phi 1$, $\phi 2$, and $\phi 3$ which are shown together in FIG. 23 and which have duty ratios over one cycle of the clock C lying in the range 80% to 20%, for example, and decreasing within said range. Thus, for a clock cycle of duration C=1 $\mu s$:

the signal $\phi 1$ is at "0" for 0.2 $\mu s$ and then at "1" for 0.8 $\mu s$;

the signal $\phi 2$ is at "0" for 0.4 $\mu s$ and then at "1" for 0.6 $\mu s$; and the signal $\phi 3$ is at "0" for 0.6 $\mu s$ and then at "1" for 0.4 $\mu s$.

These phases $\phi 1$, $\phi 2$, and $\phi 3$ are produced by a time control circuit 340 which also generates the signal POR on detecting corresponding signals on the contact area 64.

The signals $\phi 1$, $\phi 2$, and $\phi 3$ perform sequencing via gates 342, 344, 346, and 348 that are made conductive selectively and successively by the various signals $\phi 1$, $\phi 2$, and $\phi 3$ (initially gate 342 by $\phi 1$, then gates 346 and 348 by $\phi 2$, and finally gate 344 by $\phi 3$).

During automatic resetting on power-up of the card, the address A0A13 and the bit A14 are forced to zero during $\phi 1$ by the gate 342: the signal POR propagates via the gates 328, 342, 330, 324, and 326 (forcing of A14), with the forcing of the address A0A13 taking place solely via the gate 330.

During the following stage $\phi 2$, the D-type bistable 350 stores in volatile manner the bit B7 of the data bus taken from the non-volatile memory 314, which bit is the inverse of the function number FNo.

As operations continue, i.e. after the signal POR has ceased, the most significant address bit A14 takes the value which is the inverse of FNo, i.e. the value of bit B7 as sampled during power-up from address zero in the non-volatile memory, the read/write operations being synchronized by $\phi 3$.

In the event of a request to change function, as detected by bate 132, operations take place as follows.

During $\phi 1$, the addresses are forced to zero.

During $\phi 2$, the present function number is sampled again from bistable 350, and is then written (inverted) in bit 7 at address zero of the non-volatile memory 314, via switch 336. After which ($\phi 3$), the bistable 332, 334 is blocked in the address bus closure position indefinitely and unconditionally until the next time the circuit is powered-down.

FIG. 24 shows a variant of the block diagram shown in FIG. 20.

This figure has the same elements 300 to 322 as described above with reference to FIG. 20. The only functional difference between FIGS. 20 and 24 lies in the fact that in FIG. 24, the EEPROM address bus 318, i.e. the address bus 304 after being processed by the memory management circuit M3U 316, also addresses the ROM 310 and the RAM 312, whereas in FIG. 20 these two memories were addressed by the bus 304 directly connected to the CPU 302; nevertheless, this difference has no consequence on the operation of the system, since the operation of the M3U 316 is transparent, where appropriate, assuming that the circuit provides no filtering concerning addressing of the ROM 310 or of the RAM 312.

The advantage of this representation lies in showing up numerous axes of symmetry that facilitate understanding of the operation of the system of the invention:

beneath the horizontal axis XX, there are disposed: (i) permanent data specific to one card (EEPROM 314) or to all cards (ROM 310); and (ii) data means common to all cards (EEPROM 314 and ROM 310);

above the horizontal axis AA, there appears the specific combination of the two main means of the invention:

the M3U 316 which serves to calculate addresses, to control writing, and to enable any change of function, and also the contacts 64 which provide communication between the card and the external terminal; and the four flags 308 (POR, ChgF, FNo, and R*/W) whose instantaneous states serve to control the M3U 316; above this vertical axis AA, there can also be seen resources that contain no information when power is not applied;

to the right of the vertical axis BB, there are disposed resources and functions for the CPU (general processing, in particular computational functions, etc.), and also the resources necessary to enable them to be implemented (ROM 310 and RAM 312);

to the left of the vertical axis BB, there is the usable non-volatile space (EEPROM 314) together with the means specific for controlling it (M3U 316);

between the CPU 302 and the other components, there extend address lines (to the three memories) and communications lines (with the contact areas 64);

on a first diagonal XX, there are to be found writable memories (RAM 312 and EEPROM 314);

on a second diagonal YY, there are to be found the means required for making use of the writable memories, specifically:

the ROM 310 governing the functions of the microprocessor of the CPU 302; and the logic circuit (M3U 316) supervising addressing and writing specific to the programmable memory (variable) EEPROM 314, both sending data to the peripheral bus (data bus 306):

on the vertical axis BB, there are the two means which conventionally characterize a microprocessor IC card, specifically the contacts 64 in compliance with ISO 7816-3, and the CPU 302;

at the center of the configuration there is the CPU 302;

more generally, the ring surrounding the CPU (for circuits 310, 312, 314, and 316) is entirely constituted by semiconductor circuits; and with reference to the semiconductor circuits only, whose area is organized as five blocks 302, 310, 312, 314, and 316, it can be observed hat:

the center and the top left quadrant are occupied by "raw logic"; and the other three quadrants are constituted by memory matrices.

Naturally, the representation of FIG. 24 is not exclusive, and it is possible, for example, to envisage a "linear" representation as shown in FIG. 252, which is functionally equivalent to that of FIG. 24, and which may possibly constitute a subassembly of some more complex architecture.

FIG. 26 shows in greater detail how the CPU 302, the M3U 316, and the address and data buses 318 and 306 are interconnected (with the internal structure of the M3U 316 corresponding to that shown in FIG. 21 as described above).

The CPU 302 issues addressing signal A0A13 and the four flags POR, ChgF, FNo, and R*/W, with all of these signals being applied as inputs to the M3U 316 by the bus 304 and the four lines 308.

The M3U 316 outputs the address signal A0A13 which is applied to the general address bus 318, together with address bus A14 as generated in the manner described above.

The M3U also delivers the read/write signal R*/W as filtered to enable conditional writing to the EEPROM in compliance with the rules described above. It also produces a data bit which is applied in the form of a signal 322 to the line which corresponds to bit zero of the data bus 306.

The structure described above corresponds to a hardware implementation of the invention.

It is possible to replace such a hardware implementation with a software implementation, by appropriately programming the microcode of the CPU 302, or indeed the operating system of the card's micro-processor.

When such a replacement is performed, it is possible to conserve the same general architecture as above and as shown in FIG. 24, merely replacing the hard-wired logic of the unit 316 in FIG. 26 by simple interconnection lines as shown in FIG. 27 (which lines are made of aluminum on the semiconductor).

Under such circumstances, the interconnection performed by the unit 316 restores the bits A0A13 of the address signal at its output and also the read/write command R*/W, and it forces address bit A14 to zero, e.g. by zeroing the inputs POR, ChgF, and FNo of the M3U 316 and by interconnecting the input FNo and the output A14 of said circuit.

In this particular aspect, the M3U of the invention can be considered as being an additional component which improves functional performance (ergonomy, security) and the addressability of the memory, by enriching it with write functions. This component can be integrated in evolving manner in various generations of cards, for example:

First generation: the general architecture of the cards is as shown in FIG. 24, with a hard-wired M3U, as shown in FIG. 26; the functions specific to the invention are encoded in part in the ROM, and in part in the EEPROM.

Second generation: evolution of the CPU enables microcode to be incorporated specific to authorizing the encoding of the functions of the invention.

It may be observed that cards in these two first generations continue to execute exactly the same functions as before without any significant degrading of their physical performance (speed and/or power consumption), implementation of the invention typically requiring only a few individual clock cycles (for a microcode implementation), or passing through three logic layers (for a hard-wire logic implementation).

Third generation: the circuits on board these cards progressively incorporate sequences within their own operating systems suitable for exploiting functions of the invention (alternating between applications and selecting desired functions), with the operating system thus replacing the microcode. A particularly advantageous characteristic of the invention is that no prior steps are essential in order to be able to take advantage, even if only partial advantage, of the properties of the invention: new cards can easily coexist with a very large population of single-function cards.

As to adapting dialog between the user and the card/terminal interface concerning changing function, that can be downloaded into the terminal.

FIG. 28 is a flow chart showing the sequence 400 of the various operations performed in the event of generalized memory access to an EEPROM shared between two applications.

In practice, this flow chart can be implemented in various different ways:
  either by conventional software programming for the processor of the card, with this remaining under the control of the card's own operating system;
  or in the form of microcode directly driving the processor (a software layer that is not programmable from outside the CPU);
  or in a form which is hard-wired in part or in full, in which case the flow chart represents the various stages in the sequential process implemented by the circuitry of the card.

In the flow chart, the parameters POR, ChgF, A0A13, A14, FNo, and R*/W have the same meanings as they do in the preceding figures, while orders such as "lda", "cma", "sta", etc. have the meanings they usually have in microcode, i.e. respectively loading the accumulator of the processor with the value read from the memory at the addressed location, complementing the accumulator, and writing the value present in the accumulator into memory.

The sequence 400, after initial resetting operations 402, provides a step 404 in which the most significant address bit A14 is calculated, which bit is given a value that is equal to the function number (0 or 1 in the case of a two-function system), assuming the reminder of the address field A0A13 is not zero.

The following step 406 verifies whether the flag POR is 0 or 1 at the end of the sequence 400 (why and how are explained below).

If the flag POR is 1, the sequence executes a series 408 of steps corresponding to switching on (power-on reset, with the function number FNo being saved). At the end of step 408, the flag POR is reset and the sequence ends in step 410 (forcing the write command R*/W to zero).

If during step 406 the flag POR is recognized as being zero, the process examines the change-of-function parameter ChgF (step 412); if this parameter is 1, then the present situation is that of a change of function with parameters being passed, and this is handled in the special manner of the invention: the process then executes the sequence of steps 414 for changing function with parameters being passed via a non-volatile zone, and above all for erasing the RAM (step 416) in such a manner as to guarantee isolation between the application which is being closed and that which is about to be opened.

The parameter that is to be transferred is then written during step 418 (a write command R*/W at 1 is issued for the time required for such writing), and then the process is brought to an end, as before, by resetting the R*/W command to zero and by returning to the main program (step 410).

The sequence 414 comes to an end by setting the flag POR to 1, thus making it possible on the next occasion that the sequence 400 is executed, to go directly to performing the reset operation 408, thereby "virtually switching off" the card, without there being any need to disconnect it physically.

When the read or write order corresponds neither to a reset nor to a change of function, i.e. when POR=0 and ChgF=0, and depending on whether reading or writing is to be performed (step 420), the corresponding functions of a block 422 are performed, which block includes controlled read or write functions including the conventional safety mechanisms specific to IC cards. These functions comprise: a write priority test (step 424, e.g. for directly writing a ratification bit), optionally inhibiting writing to the addressed zone (step 426), and optionally inhibiting reading of the addressed zone (step 428). Once these security functions have been executed 422, and if the operation is authorized, then a read or a write is performed (step 432, or steps 430 & 418, or step 418 directly), and the process comes to an end, as before, in step 410.

In FIG. 29, there can be seen a flow chart showing an example of the sequence of operations performed by a reader, in this case a combined reader that makes it possible both to perform payment in "bank card (BC)" mode (application "BANK"), or else in "electronic purse mode" (application "PURSE").

The sequence begins with reset step 500 followed by answer to reset (ATR) step 502. This step specifies (tests 504 and 506) whether the card under test is actually configured in BANK mode or in PURSE mode.

At the following step (tests 508 and 510), the reader itself examines its own type, i.e. whether it is of the electronic payment terminal (EPT) type suitable for performing a BC type transaction by the BANK application, or on the contrary it is a terminal of the beverage dispenser type, the parking meter machine type, etc., operating in "token carrier" mode (PURSE application).

If the card is configured in BANK mode and the reader is of the token-carrier type, or if the card is configured in PURSE mode and the reader is of EPT type, then a CF instruction for changing function (blocks 512 and 514, respectively) is issued to the card in such a manner as to make it compatible with this type of terminal.

The transaction can then be executed, either in bank card transaction mode (block 516) or else in PURSE transaction mode (block 518).

It is possible to envisage the situation in which the user, the holder of a combined BANK/PURSE card, which is presently configured in BANK mode, might attempt to use a device such as a beverage dispenser or a parking meter machine that is suitable for operating in PURSE mode only, and which has not yet been upgraded so as to enable it to perform the automatic change of function as explained above.

Under such circumstances, it suffices for the user to find a reader of any type that includes the special means of the invention for changing function (e.g. a GSM telephone carried by the user, a neighboring pay phone, or a special peripheral of a personal computer, etc.). After causing the function to be changed in said other reader, i.e. after switching the card into PURSE mode, the user can return to the old-generation dispenser, and make payment in its native PURSE mode.

A particular implementation as shown in FIG. 29, consists in using the terminal for refilling the PURSE by means of a BC transaction, initially by performing a BC transaction in which the bearer's account is debited, then loading the PURSE from the contents of a register that stores the value debited in this way. Naturally, the BC and PURSE type transactions are separated by an order for changing function that causes the card to be reconfigured from one mode to the other and that erases a maximum number of live elements on the semiconductor.

What is claimed is:

1. A method of using a microcircuit card in a plurality of applications, the method comprising the steps of:
  taking the card (24) as initially configured for a first application and coupling it with a terminal (14);
  executing a special transaction to reconfigure the software of the card for a target application so that the card as reconfigured in this way emulates a card specific to the target application; and executing a transaction of the target application; which method is characterized by the card, with the exception of its non-volatile memory, being subjected to a general reset to zero on each change of configuration.

2. The method of claim 1, in which the first application is a default application, the reconfiguration step taking place when the card is coupled to a default application terminal, and the card as reconfigured in this way is subsequently coupled to a target application terminal to execute the target application.

3. The method of claim 2, including the following subsequent steps:

the card as reconfigured for the target application is coupled with a terminal of the default application; and another special transaction is executed serving to return to the software configuration for the default application.

4. The method of claim 1, in which the first application is a SIM card application for GSM radiotelephony.

5. The method of claim 4, in which the target application is a token-carrier type application.

6. The method of claim 1, in which the first application is a bank card application.

7. The method of claim 6, in which the target application is a SIM card application for GSM radiotelephony and/or a token-carrier type application.

8. The method of claim 6, in which the first application is an electronic purse type application and the target application is a bank card type application enabling the electronic purse to be refilled.

9. The method of claim 1, in which the card includes read/write memory, and the general reset includes erasing said read/write memory.

10. The method of claim 1, in which the general reset is performed by applying a signal on a special command line.

11. The method of claim 1, in which the general reset is performed by closing an addressing gate of the memory.

12. The method of claim 1, in which the general reset is performed by executing a specific sequence of instructions, in particular instructions of the card's operating system, the instructions of applications software stored in the card, or indeed the instructions of the microcode of the card's processor.

13. The method of claim 1, in which the card has a non-volatile memory (158, 314) subdivided into distinct zones (162, 164; 162, 164, 168, 170) usable respectively for each of the applications exclusively, the configuration of the card for any one of the applications forcing addressing onto the zone corresponding to the configured application until the card is reset.

14. The method of claim 13, in which the non-volatile memory further includes a single common zone (160) that is addressable in a plurality of configurations of the card, and receiving parameters to be transferred between successive applications corresponding to said configurations.

15. A system for using a microcircuit card in a plurality of applications, the system comprising:

microcircuit cards (14) comprising:
means (68) enabling a first application to be executed;
means (66) enabling a target application to be executed; and
switch means (70–92) enabling said card to be reconfigured on command either as a first application card or as a target application card;
terminals (14) suitable for executing a transaction of the first application; and
terminals (18) suitable for executing a transaction of the target application;

at least some of said terminals being suitable for executing a special transaction suitable for applying a reconfiguration command to the card to reconfigure it for the target application so that the card when reconfigured in this way emulates a card specific to the target application;

the system being characterized in that the switch means (70–92) in each card include means suitable, on each change of configuration, for imposing a general reset to zero on the card, with the exception of its non-volatile memory.

16. The system of claim 15, in which the first application is a default application, the switch means (70–92) performing reconfiguration when the card is coupled to a terminal of the default application, the card as reconfigured in this way then being coupled to a terminal of the target application to execute the target application.

17. The system of claim 16, in which the default application terminals are also suitable for executing another special transaction suitable for applying a return command to the card to cause it to return to the default application configuration.

18. The system of claim 16, in which the default application terminals include control means (22) usable by the bearer of the card, enabling the bearer to initiate said special transaction or said other special transaction.

19. The system of claim 15, in which the card includes a non-volatile memory element, in particular a non-volatile D-type bistable (110, 128, 202), that conserves in permanent manner a data item that identifies the current software configuration of the card.

20. The system of claim 15, in which the card has a memory element, in particular a D-type bistable (110, 128, 202) storing a data item (FNo) identifying the current software configuration of the card throughout the duration of the session.

21. The system of claim 15, in which the switch means (70–92) include means (340) producing synchronization signals ($\phi1$, $\phi2$, and $\phi3$) for synchronizing the sequencing of operations for managing card reset and card change of function.

22. The system of claim 15, including means for jointly paginating all of the memory matrices of the card, whether volatile or otherwise, whether programmable or otherwise.

* * * * *